(12) United States Patent
Pagare

(10) Patent No.: US 10,754,812 B2
(45) Date of Patent: Aug. 25, 2020

(54) N-DEPTH ASYNCHRONOUS FIFO INCLUDING A COLLECTION OF 1-DEPTH FIFO CELLS

(71) Applicant: Intel IP Corporation, Santa Clara, CA (US)

(72) Inventor: Vinod Pagare, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 429 days.

(21) Appl. No.: 15/463,985

(22) Filed: Mar. 20, 2017

(65) Prior Publication Data

US 2018/0267924 A1 Sep. 20, 2018

(51) Int. Cl.
*G06F 13/42* (2006.01)
*G06F 13/36* (2006.01)
*G06F 13/40* (2006.01)

(52) U.S. Cl.
CPC .......... *G06F 13/4239* (2013.01); *G06F 13/36* (2013.01); *G06F 13/4068* (2013.01)

(58) Field of Classification Search
CPC .................................................. G06F 17/5045
See application file for complete search history.

(56) References Cited

U.S. PATENT DOCUMENTS

| | | | | |
|---|---|---|---|---|
| 5,546,347 A | * | 8/1996 | Ko | .............. G06F 5/16 365/189.02 |
| 7,953,907 B1 | * | 5/2011 | Nguyen | .............. G06F 11/0793 370/216 |
| 2005/0041450 A1 | * | 2/2005 | Duh | .......... G06F 5/06 365/1 |

* cited by examiner

*Primary Examiner* — Henry Tsai
*Assistant Examiner* — Juanito Borromeo
(74) *Attorney, Agent, or Firm* — Schwegman Lundberg & Woessner, P.A.

(57) ABSTRACT

Some embodiments include apparatuses and methods of using the apparatuses. One of the apparatuses includes first-in first-out (FIFO) cells included in an asynchronous FIFO unit and first and second circuits included in the asynchronous FIFO unit. The first circuit provides first information based on a value of a first bit from each of the FIFO cells in order to select one of the FIFO cells to be a selected FIFO cell for storing data information in the selected FIFO cell. The second circuit provides information based on a value of a second bit from each of the FIFO cells in order to select one of the FIFO cells to be a selected FIFO cell for reading data information from the selected FIFO cell.

17 Claims, 13 Drawing Sheets

N-DEPTH ASYNCHRONOUS FIFO INCLUDING A COLLECTION OF 1-DEPTH FIFO CELLS

TECHNICAL FIELD

Embodiments described herein pertain to memory circuitry in electronic devices and systems. Some embodiments relate to first-in first-out (FIFO) circuitry and FIFO operations.

BACKGROUND

FIFO circuitry is memory circuitry used to store information (e.g., data). Many electronic devices (e.g., integrated circuit (IC) chips) and systems (e.g., computers, cellular phones, digital televisions, etc.) often have FIFO circuitry to temporarily store information when the information is transferred from one component to another component of the same device or between different devices of the systems. FIFO circuitry can operate to store different information in a sequential order in different memory locations in the FIFO circuitry. The stored information can be read (e.g., retrieved) in the same sequential order (e.g., in a first-in first-out order). Thus, in FIFO circuitry, information stored in the FIFO circuitry first (first-in) is read from the circuitry first (first-out), and information stored in the FIFO circuitry last is read from the FIFO circuitry last. FIFO circuitry often use write pointer information to indicate into which memory location in the FIFO circuitry information can be stored, and read pointer information to indicate in which memory location in the FIFO information can be read.

Asynchronous FIFO circuitry is one type of FIFO circuitry. Asynchronous FIFO circuitry allows information to be stored in (e.g., written in) and read from the asynchronous FIFO circuitry using timing of different clock signals from different clock domains (e.g., a write clock domain and a read clock domain). Conventional asynchronous FIFO circuitry often use multiple and encoded bits to represent the value of the write pointer information and multiple and encoded bits (multiple binary digits) to represent the value of the read pointer information. In some devices or systems, factors such as operating conditions, if not carefully considered during design, may cause the value of the write pointer information, the read pointer information, or both information to be temporary incorrect. Such temporary incorrect values can lead to unexpected device or system behavior including functional failures.

DETAILED DESCRIPTION

The techniques described herein in include an improved asynchronous FIFO unit. The described asynchronous FIFO unit is an N-depth FIFO unit, which includes a collection (e.g., a number) of 1-depth asynchronous FIFO cells. Detailed structures, operations, and improvements of the described asynchronous FIFO units are presented below reference to FIG. 1 through FIG. 12.

Figure 1:
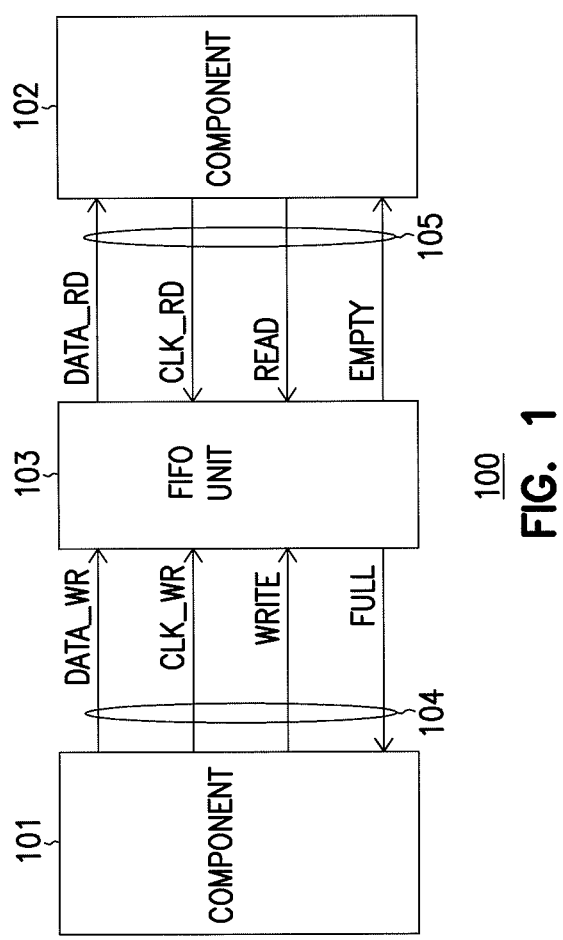
FIG. 1 shows an apparatus including circuit components and a FIFO unit, according to some embodiments described herein

FIG. 1 shows an apparatus 100 including circuit components 101 and 102 and a FIFO unit 103, according to some embodiments described herein. Apparatus 100 can include or be included in an electronic device or system, such as a computer (e.g., server, desktop, laptop, or notebook), a tablet, a cellular phone, or other electronic devices or systems. Component 101, component 102, and FIFO unit 103 can be part of the same device. For example, apparatus 100 can include a device that has a single IC chip where component 101, component 102, and FIFO unit 103 can be located on (e.g., formed in or formed on) a semiconductor (e.g., silicon) substrate of the IC chip. In this example, component 101, component 102, and FIFO unit 103 can be located on the same semiconductor substrate of the IC chip and can communicate with each other through conductive paths 104 and 105 that are also formed inside the IC chip (e.g., inside the same device). In this example, circuit components 101 and 102 can include any combination (e.g., any two of) of a processing unit (e.g., a processing core of a general purpose processor or a digital signal processing (DSP) processor), a memory device, a direct memory controller, a bus controller, a radio frequency (RF) module (e.g., RF transceiver), an analog to digital converter (ADC), or other circuit components.

Alternatively, component 101, component 102, and FIFO unit 103 can be located in different (e.g., separate) devices. For example, apparatus 100 can include a circuit board (e.g., printed circuit board (PCB)) and component 101, component 102, and FIFO unit 103 can be located on different IC chips (e.g., three IC chips) and can communicate with each other through conductive paths (e.g., metal traces) 104 and 105 that are formed on the circuit board.

In FIG. 1, components 101 and 102 can operate using different clock domains (e.g., different clock signals having different frequencies). For example, component 101 can operate using one clock domain based on timing of a clock signal (or clock signals)). Component 102 can operate using another clock domain based on timing of another clock signal (or clock signals)).

FIFO unit 103 can include memory latches, memory cells, RAM circuits, or other types of physical memory elements that can store information (e.g., data information). FIFO unit 103 can operate to store (e.g., temporarily store) information provided by component 101. The stored information can be read by component 102. FIFO unit 103 can include an asynchronous FIFO unit in that it can operate using different clock domains. For example, FIFO unit 103 can allow storing of information in it based on one clock domain (e.g., a write clock domain used by component 102), and allow reading of the stored information based on another clock domain (e.g., a read clock domain used by component 102). Thus, FIFO unit 103 can serve as an intermediate memory location to allow transfer of information from component 101 to component 102.

As shown FIG. 1, FIFO unit 103 can receive information (e.g., input data information) DATA_WR, a clock signal CLK_WR, and a signal WRITE (e.g., a write command) from component 101. FIFO unit 103 can perform a write operation in response to signal WRITE to store information DATA_WR in FIFO cells (not shown) of FIFO unit 103. FIFO unit 103 can use clock signal CLK_WR as timing for some of its operations within the write operation. FIFO unit 103 can generate a signal FULL, which can contain information (e.g., status information) indicating whether FIFO unit 103 is full (or not full). FIFO unit 103 is available to store information when it is not full (e.g., when at least one of its FIFO cells is available to store information). FIFO unit 103 is unavailable to store information when it is full (e.g., when none of its FIFO cells is available to store information). Based on signal FULL, component 101 can decide whether to continue (or to wait FIFO unit 103 is not full) to send information to be stored in FIFO unit 103.

As shown FIG. 1, FIFO unit 103 receives a clock signal CLK_RD and a signal READ (e.g., a read command) from component 102. FIFO unit 103 can perform a read operation in response to signal READ to read (e.g., obtain) information stored its FIFO cells. FIFO unit 103 can provide information (e.g., output data information) DATA_RD to component 102. FIFO unit 103 can use clock signal CLK_DR as timing for some of its operations within the read operation. FIFO unit 103 can generate a signal EMPTY, which can contain information (e.g., status information) indicating whether FIFO unit 103 is empty (or not empty). FIFO unit 103 is available to be read (e.g., to be retrieved) when it is not empty (e.g., when it contains information that has not been read). FIFO unit 103 is unavailable to be read (e.g., unavailable to be retrieved) when it is empty (e.g., when it has no stored information or when current information in it has been read). Based on signal EMPTY, component 102 can decide whether to continue (or to wait unit FIFO unit 103 is not empty) to read information from FIFO unit 103.

FIFO unit 103 can include an N-depth FIFO that includes a collection of 1-depth FIFO cells (where N is an integer greater than one). FIFO unit 103 can include any of the N-depth FIFO units described below with reference to FIG. 2 through FIG. 13.

Figure 2:
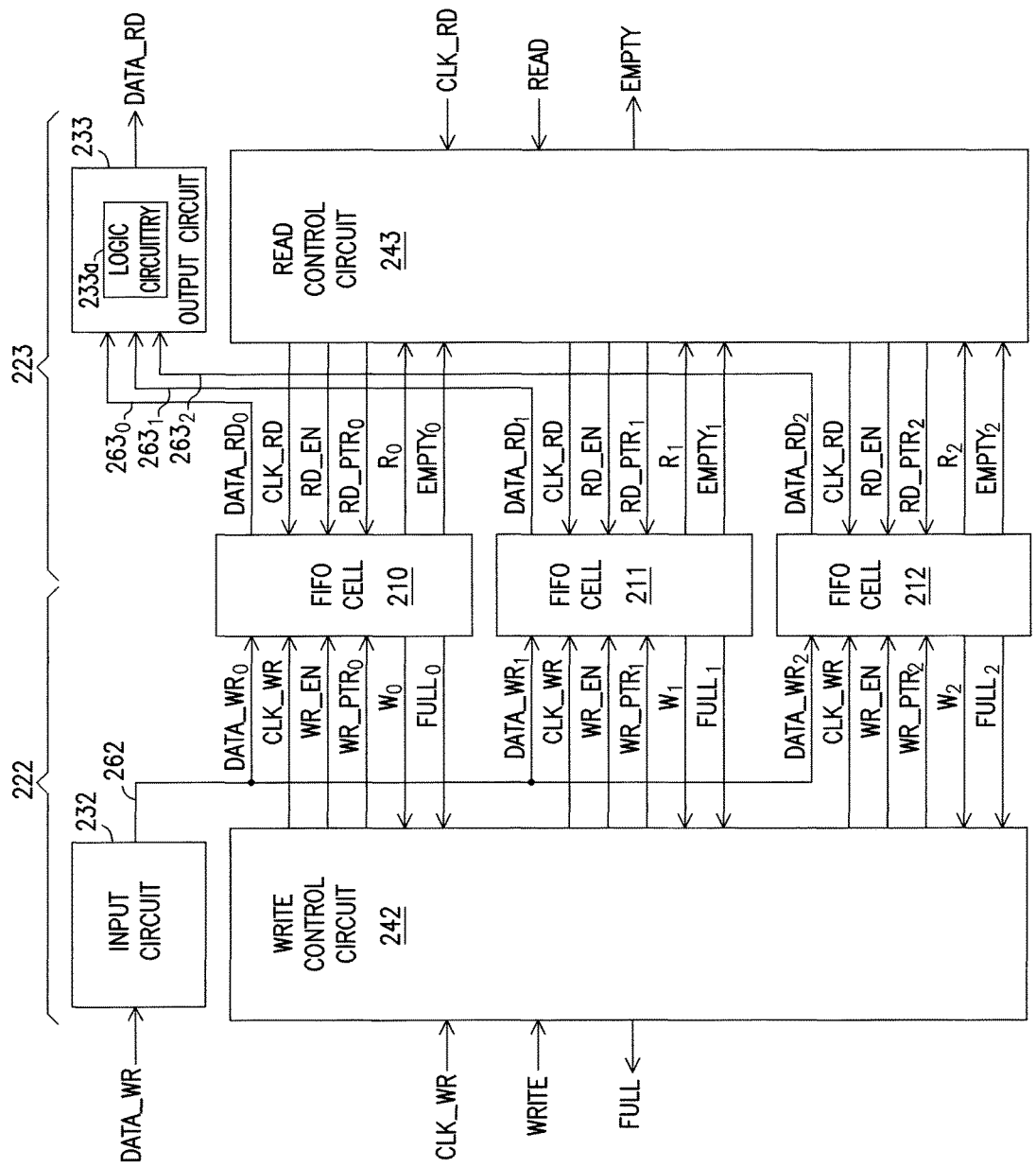
FIG. 2 shows a block diagram of a FIFO unit including FIFO cells, according to some embodiments described herein.

FIG. 2 shows a block diagram of a FIFO unit 203 including FIFO cells 210, 211, and 212, according to some embodiments described herein. FIFO unit 203 can also include an input circuit 232, an output circuit 233, a write control circuit 242, and a read control circuit 243. FIFO unit 203 can correspond to FIFO unit 103 of FIG. 1. FIG. 2 shows input circuit 232 separate from write control circuit 242 as an example. However, input circuit 232 can be part of write control circuit 242 as an example. Similarly, FIG. 2 shows output circuit 233 separate from read control circuit 243 as an example. However, output circuit 233 can be part of read control circuit 243.

In FIG. 2, FIFO unit 203 can be an asynchronous FIFO unit in that it can operate with different clock domains including a write clock domain 222 and a read clock domain 223. Write clock domain 222 can be associated with operations of a component (e.g., component 101 of FIG. 1) that stores (e.g., writes) information (e.g., data information) in FIFO unit 203. Read clock domain 223 can be associated with operations of a component (e.g., component 102 of FIG. 1) that reads information from FIFO unit 203.

As shown in FIG. 2, FIFO unit 203 can receive clock signals CLK_WR and CLK_RD. Clock signal CLK_WR can be provided to FIFO unit 203 from the component associated with write clock domain 222. Clock signal CLK_RD can be provided to FIFO unit 203 from the component associated with read clock domain 223. Clock signals CLK_WR and CLK_RD can have different frequencies or phases.

Each of FIFO cells 210, 211, and 212 can be an asynchronous FIFO unit in that each of FIFO cells 210, 211, and 212 can operate with write clock domain 222 and read clock domain 223. For example, each of FIFO cells 210, 211, and 212 203 can operate to store information in a write operation based on timing of clock signal CLK_WR, and read the stored information during a read operation based on timing of clock signal CLK_RD.

Each of FIFO cells 210, 211, and 212 can be a 1-depth FIFO to store information, such that each of FIFO cells 210, 211, and 212 can store a number (e.g., a maximum number) of X bits of information (e.g., a binary word) within a time interval based on timing from write clock domain 222. X is an integer at least equal to one. The X bits of information can be provided (e.g., provided in parallel) to FIFO unit 203 within a time interval. Such a time interval can be based on timing of clock signal CLK_WR, in which the time interval can be a fraction (e.g., one-half) of a period or the entire period of clock signal CLK_WR. Thus, each of FIFO cells 210, 211, and 212 can be a 1-depth FIFO that can store a maximum number of bits (e.g., X bits) within a time interval (e.g., a fraction of a period or the entire period) of a clock signal (e.g., clock signal CLK_WR) associated with write clock domain 222.

As an example, if each of FIFO cells 210, 211, and 212 of FIFO unit 203 is configured (e.g., structured) to store X=8 bits (e.g., a 1-depth FIFO that can store a maximum number of 8 bits), then FIFO cell 210 can store 8 bits (e.g., first eight bits) during a first write operation of FIFO unit 203, FIFO cell 211 can store another 8 bits (e.g., second eight bits) during a second write operation of FIFO unit 203, and FIFO cell 212 can store another 8 bits (e.g., third eight bits) during a third write operation of FIFO unit 203.

FIG. 2 shows an example where FIFO unit 203 includes three (N=3) 1-depth FIFO cells 210, 211, and 212. However, FIFO unit 203 can include any number of one or more than one 1-depth FIFO cell (e.g., N=1, N=2. N=3, N=4, and other odd and even values of N). In FIG. 2, FIFO unit 203 is an N-depth FIFO, where N is an integer having a value equal to the number of 1-depth FIFO cells included in FIFO unit 203. Thus, in the example of FIG. 2, FIFO unit 203 is a 3-depth FIFO unit because it includes three (N=3) 1-depth FIFO cells 210, 211, and 212. However, FIFO unit 203 can be any N-depth FIFO unit where N is least one. For example, FIFO unit 203 can include 16 1-depth FIFO cells (e.g., N=16) such that FIFO unit 203 can be a 16-depth FIFO unit. In another example, FIFO unit 203 can include 35 FIFO cells (e.g., N=35) such that FIFO unit 203 can be a 35-depth FIFO unit. In another example, FIFO unit 203 can include 256 FIFO cells (e.g., N=256) such that FIFO unit 203 can be 256-depth FIFO unit. In sum, FIFO unit 203 can include at least one 1-depth FIFO cell, and the number (N) of 1-depth FIFO cells can be an odd number (e.g., number that is not a power of two (unequal to a multiple of two)) or an even number (e.g., a number that may or may not be power of two).

As shown in FIG. 2, FIFO unit 203 can receive information (e.g., input data) DATA_WR at input circuit 232, and a signal WRITE (e.g., a write command) at write control circuit 242. Information DATA_WR and signal WRITE can be provided to FIFO unit 203 from a component (not shown in FIG. 2) associated with write clock domain 222 that can be component 101 of FIG. 1. Information DATA_WR can be provided in parallel (e.g., transmitted concurrently) to FIFO unit 203. For example, information DATA_WR can include X bits that can be transmitted on an X-bit-wide bus coupled between FIFO unit 203 and the component that provides signal WRITE to FIFO unit 203.

FIFO unit 203 can perform a write operation in response to signal WRITE. In a write operation, FIFO unit 203 can selectively store information DATA_WR in FIFO cells 210, 211, and 212. Information $DATA\_WR_0$, $DATA\_WR_1$, and $DATA\_WR_2$ represent different input information (e.g., input data information) stored in FIFO cells 210, 211, and 212, respectively, at different times. As shown in FIG. 2, input circuit 232 can include an output 262 ((e.g., output nodes that can be part of parallel conductive lines) to provide information DATA_WR. FIFO cells 210, 211, and 212 can share to the same output 262 (e.g., each of FIFO cells 210, 211, and 212 can include an input coupled to output 262). However, only one particular FIFO cell among FIFO cells 210, 211, and 212 can be enabled (e.g., activated) at a time, such that only the particular FIFO cell (which is enabled) can capture (e.g., latch) information from output 262 in a write operation. Then, the particular FIFO can store the captured information (e.g., one of information $DATA\_WR_0$, $DATA\_WR_1$, and $DATA\_WR_2$) in that particular FIFO.

Write control circuit 242 can generate a signal FULL, which can contain information (e.g., status information) indicating whether FIFO unit 203 is full (or not full). FIFO unit 203 is available to store information when it is not full. FIFO unit 203 is unavailable (not available) to store information when it is full. Write control circuit 242 can generate signals WR_EN (e.g., write enable signal) and signals (each of which can contain write pointer information) $WR\_PTR_0$, $WR\_PTR_1$, and $WR\_PTR_2$ that can be used to control FIFO cells 210, 211, and 212 during a write operation.

FIFO unit 203 can operate such that it stores (e.g., writes) information in FIFO cells 210, 211, and 212 in a circular fashion (e.g., circular write operation). In the circular write fashions, FIFO unit 203 can be initially reset (e.g., in a reset operation), such that it can start storing information (e.g., first information) at a first location (e.g., at FIFO cell 210). FIFO unit 203 can sequentially store additional information (e.g., second and third information) in second and third locations (e.g., in FIFO cells 211 and 212, respectively) until the last location (e.g., FIFO cell 212) has stored information (e.g., last location is full). Then, the next information (e.g., fourth information) can be stored in the first location (e.g., in FIFO cell 210) after the previous stored information (e.g., first information) has been read from the first location (e.g., from FIFO cell 210).

As shown in FIG. 2, FIFO unit 203 can receive a signal READ (e.g., a read command) at read control circuit 243.

Signal READ can be provided to FIFO unit 203 from a component (not shown in FIG. 2) associated with read clock domain 223 that can be component 102 of FIG. 1. FIFO unit 203 can perform a read operation in response to signal READ and the control information. In a read operation, FIFO unit 203 can selectively read information from FIFO cells 210, 211, and 212. Information $DATA\_RD_0$, $DATA\_RD_1$, and $DATA\_RD_2$ represent different information (e.g., output data information) read from FIFO cells 210, 211, and 212, respectively.

FIFO cells 210, 211, and 212 can include respective outputs $263_0$, $263_1$, and $263_2$ to provide information $DATA\_RD_0$, $DATA\_RD_1$, and $DATA\_RD_2$, respectively. Each of outputs $263_0$, $263_1$, and $263_2$ can include output nodes that can be part of parallel conductive lines.

Output circuit 233 can provide information DATA_RD (e.g., output data) during a read operation. Information DATA_RD can be provided in parallel (e.g., transmitted concurrently) to a component (e.g., component 102 of FIG. 1) that provides signal READ to FIFO unit 203. For example, information DATA_RD can include X bits that can be transmitted on an X-bit-wide bus coupled between FIFO unit 203 and the component that provides signal READ to FIFO unit 203. The value of information DATA_RD is the value of one of information $DATA\_RD_0$, $DATA\_RD_1$, and $DATA\_RD_2$ read from one of FIFO cells 210, 211, and 212. Output circuit 233 can include logic circuitry (e.g., bit-wise OR (logic OR) circuitry) 233a that can perform a logic operation (e.g., bit-wise OR operation) on the bits of information $DATA\_RD_0$, $DATA\_RD_1$, and $DATA\_RD_2$ to generate information DATA_RD.

Read control circuit 243 can generate a signal EMPTY, which can contain information (e.g., status information) indicating whether FIFO unit 103 is empty (or not empty). FIFO unit 203 is available to be read when it is not empty (e.g., when at least one of its FIFO cells contains information that has not been read). FIFO unit 203 is unavailable to be read when it is empty (e.g., when FIFO unit 203 has no stored information or when current information in all FIFO cells 210, 211, and 212 has been read). Read control circuit 243 can generate signals RD_EN (e.g., read enable signal) and signals (each of which can contain read pointer information) $RD\_PTR_0$, $RD\_PTR_1$, and $RD\_PTR_2$ that can be used to control FIFO cells 210, 211, and 212 during a read operation.

FIFO unit 203 can operate such that it reads information from FIFO cells 210, 211, and 212 in a circular fashion (e.g., circular read operation). In the circular read fashion, FIFO unit 203 can be initially reset (e.g., in a reset operation) such that it can start reading information (e.g., first information) from a first location (e.g., at FIFO cell 210). FIFO unit 203 can sequentially read additional information (e.g., second and third information) from second and third locations (e.g., in FIFO cells 211 and 212, respectively) until the last location (e.g., FIFO cell 212) has been read (e.g., the last location is empty). Then, in a subsequent read operation, information (e.g., fourth information) can be read from the first location (e.g., from FIFO cell 210) after information (e.g., fourth information) has been stored in the first location (e.g., in FIFO cell 210).

As shown in FIG. 2, FIFO cells 210, 211, and 212 can generate corresponding signals $W_0$, $FULL_0$, $W_1$, $FULL_1$, $W_2$, and $FULL_2$. Based on these signals, write control circuit 242 can generate signals $WR\_PTR_0$, $WR\_PTR_1$, and $WR\_PTR_2$ to selectively store information in FIFO cells 210, 211, and 212. FIFO cells 210, 211, and 212 can also generate corresponding signals $R_0$, $EMPTY_0$, $R_1$, $EMPTY_1$, $R_2$, and $EMPTY_2$. Based on these signals, read control circuit 243 can generate signals $RR\_PTR_0$, $RR\_PTR_1$, and $RR\_PTR_2$ to selectively read information from FIFO cells 210, 211, and 212.

Figure 3:
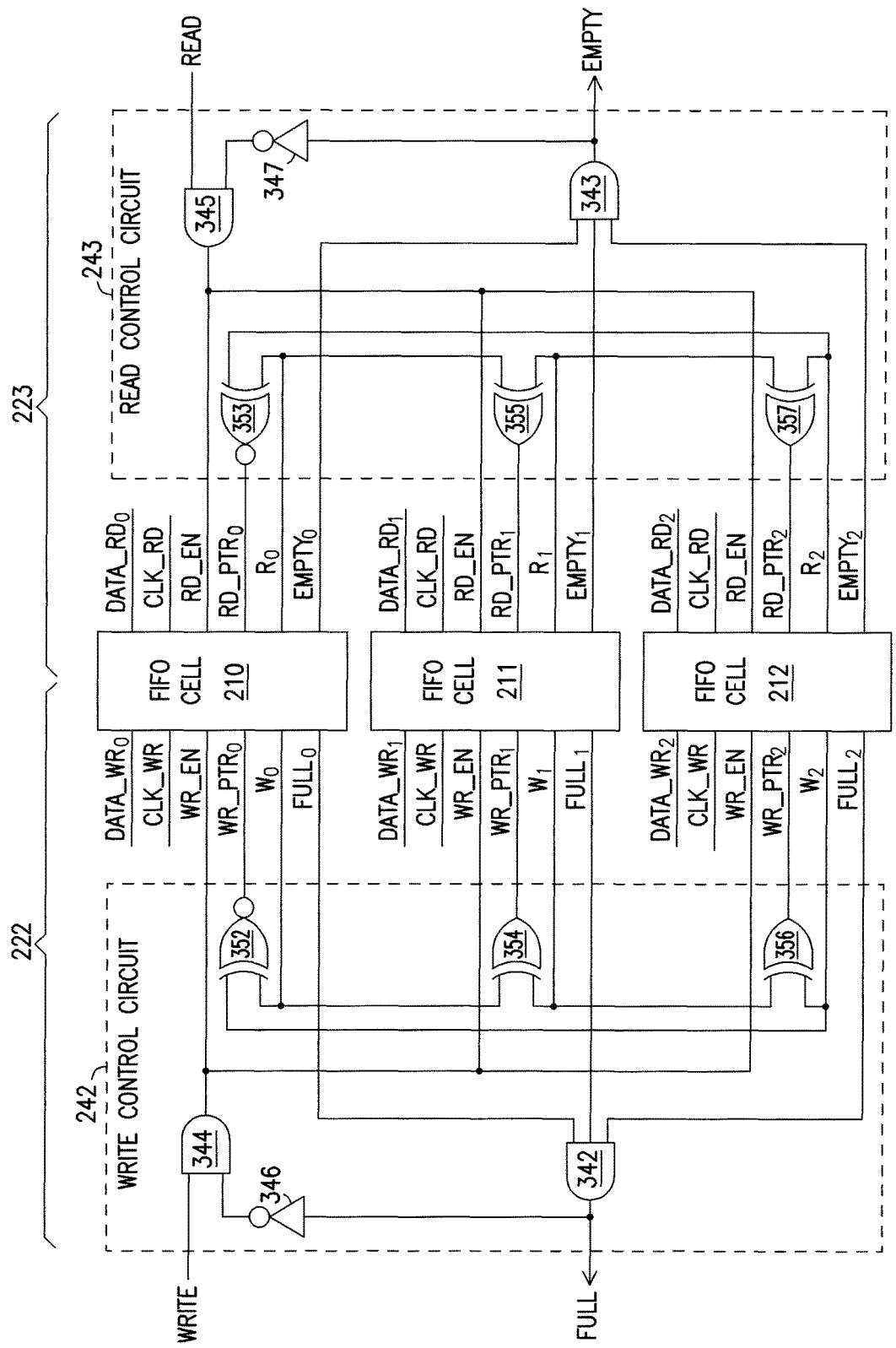
FIG. 3 shows a schematic diagram of the FIFO unit of FIG. 2, including circuit elements of a write control circuit and a read control circuit of the FIFO unit of FIG. 2, according to some embodiments described herein.

FIG. 3 shows schematic diagram of FIFO unit 203 including circuit elements of write control circuit 242 and read control circuit 243 of FIG. 2, according to some embodiments described herein. As shown in FIG. 3, write control circuit 242 can include a logic gate (e.g., AND gate) 342 that can operate to generate signal FULL. As described above with reference to FIG. 2, signal FULL can contain information indicating whether FIFO unit 203 is full (e.g., unavailable to store information) or not full (e.g., available to store information). In FIG. 3, logic gate 342 can receive (at its input nodes) signals $FULL_0$, $FULL_1$, and $FULL_2$. Signal $FULL_0$ can contain information indicating whether FIFO cell 210 is full (e.g., when FIFO cell 210 is unavailable to store information) or not full (e.g., when FIFO cell 210 is available to store information). Similarly, signal $FULL_1$ and $FULL_2$ can contain information indicating whether FIFO cells 211 and 212, respectively, are full (e.g., unavailable to store information) or not full (e.g., available to store information).

The value of signal FULL is based on the values of signals $FULL_0$, $FULL_1$, and $FULL_2$. Signal FULL can have different signal levels (e.g., voltage values) that can represent different values. For example, signal FULL can have a signal level corresponding to logic 1 (e.g., FULL=1 (a single bit having a value of 1)) and a signal level corresponding to logic 0 (e.g., FULL=0 (a single bit having a value of 0)). FULL=1 (when $FULL_0$=1, $FULL_1$=1, and $FULL_2$=1) can indicate that FIFO unit 203 is full. FULL=0 (when at least one of $FULL_0$, $FULL_1$, and $FULL_2$ is zero (logic 0)) can indicate that FIFO unit 203 is not full.

FIFO unit 203 can be included in a system (e.g., apparatus 100) that may use an indication of a FIFO empty level (FIFO not full) in a write clock domain, so that a write burst operation can be triggered. In such a system, the FIFO empty level information can be provided by FIFO unit 203 as follows. Empty_level=!$FULL_0$+!$FULL_1$+$FULL_M$ (where "!" means logical "not"; "+" means numerical addition (or summation); M=N−1; and N is the number of FIFO cells).

In FIG. 3, write control circuit 242 can include a logic gates (e.g., AND gate) 344 and an inverter 346 that can operate to generate signal WR_EN based on signal FULL and signal WRITE. Signal WR_EN can contain information indicating whether FIFO cells 210, 211, and 212 can be allowed (e.g., enabled) to store information. Signal WR_EN can have different signal levels (e.g., voltage values) that can represent different values. For example, signal WR_EN can have a signal level corresponding to logic 1 (e.g., WR_EN=1), and a signal level corresponding to logic 0 (e.g., WR_EN=0). WR_EN=1 (when WRITE=1 and FULL=0) can indicate that at least one of FIFO cells 210, 211, and 212 of FIFO unit 203 can be allowed to store information. WR_EN=0 (when WRITE=1 and FULL=1) can indicate that none of FIFO cells 210, 211, and 212 of FIFO unit 203 can be allowed to store information.

As shown in FIG. 3, write control circuit 242 can include a logic gate (e.g., exclusive NOR gate) 352 and logic gates (e.g., exclusive OR gates) 354 and 356 that can operate to generate signals $WR\_PTR_0$, $WR\_PTR_1$, and $WR\_PTR_2$. In FIFO unit 203, FIFO cells 210, 211, and 212 can be sequentially selected (e.g., selected at a time) to store information. Signal $WR\_PTR_0$ can contain write pointer information that can indicate whether FIFO cell 210 is selected or not selected (unselected) to store information in a write operation of FIFO unit 203. Signal $WR\_PTR_0$ can have different signal levels (e.g., voltage values) that can represent different values. For example, signal $WR\_PTR_0$ can have a signal level corresponding to logic 1 (e.g., $WR\_PTR_0$=1 (a single bit having a value of 1)) and a signal level corresponding to logic 0 (e.g., $WR\_PTR_0$=0 (a single bit having a value of 0)). $WR\_PTR_0$=1 can indicate that FIFO cell 210 is the FIFO cell (among FIFO cells 210, 211, and 212) selected to store information in a write operation. $WR\_PTR_0$=0 can indicate that FIFO cell 210 is not selected (e.g., either FIFO cell 211 or 212 is selected) to store information in a write operation. Similarly, each of signals $WR\_PTR_1$ and $WR\_PTR_2$ can contain write pointer information that can indicate whether FIFO cell 211 and FIFO cell 212, respectively, is selected or not selected (unselected) to store information in a write operation of FIFO unit 203.

Each of signals $W_0$, $W_1$, and $W_2$ can carry information (e.g., write flag information) to indicate an occurrence of information being stored in a respective FIFO cell among FIFO cells 210, 211, and 212. As shown in FIG. 3, signals $W_0$, $W_1$, and $W_2$ can be selectively provided to input nodes of logic gates 352, 354, and 356. Signal $W_0$ can have different signal levels (e.g., voltage values), such as a signal level corresponding to logic 1 (e.g., $W_0$=1 (a single bit having a value of 1)) and a signal level corresponding to logic 0 (e.g., $W_0$=0 (a single bit having a value of 0)). When (e.g., each time) information (e.g., new information) is stored in FIFO cell 210, the value of the bit presented by signal $W_0$ can change (e.g., toggle) from its current value to another value (e.g., from a current $W_0$=0 to $W_0$=1, or from current $W_0$=1 to $W_0$=0). Similarly, when (e.g., each time) information (e.g., new information) is stored in FIFO cell 211, the value of the bit presented by signal $W_1$ can change (e.g., toggle) from its current value to another value (e.g., from a current $W_1$=0 to $W_1$=1, or from a current value of $W_1$=1 to $W_1$=0). When (e.g., each time) information (e.g., new information) is stored in FIFO cell 212, the value of the bit presented by signal $W_2$ can change (e.g., toggle) from its current value to another value (e.g., from a current value of $W_2$=0 to $W_2$=1, or from a current $W_2$=1 to $W_2$=0)

Write control circuit 242 can use logic gates 352, 354, and 356 to generate signals $WR\_PTR_0$, $WR\_PTR_1$, and $WR\_PTR_2$ having values based on the values of signals $W_0$, $W_1$, and $W_2$. FIFO unit 203 can determine which FIFO cell among FIFO cells 210, 211, and 212 is selected to store information based on the values of $WR\_PTR_0$, $WR\_PTR_1$, and $WR\_PTR_2$ during a write operation. For example, during a particular write operation (e.g., write cycle), if WR_PTR0=1, WR_PTR1=0, and WR_PTR2=0 then, FIFO cell 210 is selected to store information (e.g., X bits) during that particular write operation. In another example, if WR_PTR0=0, WR_PTR1=1, and WR_PTR2=0 then, FIFO cell 211 is selected to store information (e.g., X bits). Thus, based on the value (e.g., binary value of only single-bit) of one of signals $WR\_PTR_0$, $WR\_PTR_1$, and $WR\_PTR_2$ during a particular write operation, one (e.g., only one) of FIFO cells 210, 211, and 212 can be selected to store information in that particular write operation.

Read control circuit 243 can include a logic gate (e.g., AND gate) 343 that can operate to generate signal EMPTY. As described above with reference to FIG. 2, signal EMPTY can contain information indicating whether FIFO unit 203 is empty (e.g., unavailable to be read) or not empty (e.g., available to be read). Logic gate 343 can receive (at its input nodes) signals $EMPTY_0$, $EMPTY_1$, and $EMPTY_2$. Signal $EMPTY_0$ can contain information indicating whether FIFO cell 210 is empty (or not empty). FIFO cell 210 is available to be read when it is not empty (e.g., when it contains information that has not been read). FIFO cell 210 is unavailable to be read when it is empty (e.g., when it has no stored information or when current information in FIFO cell 210 has been read). Similarly, signal $EMPTY_1$ and $EMPTY_2$ can contain information indicating whether FIFO cells 211 and 212, respectively, are empty (e.g., unavailable to be read) or not empty (e.g., available to be read).

The value of signal EMPTY is based on the values of signals $EMPTY_0$, $EMPTY_1$, and $EMPTY_2$. Signal EMPTY can have different signal levels (e.g., voltage values) that can represent different values. For example, signal EMPTY can have a signal level corresponding to logic 1 (e.g., EMPTY=1 (a single bit having a value of 1)), and a signal level corresponding to logic 0 (e.g., EMPTY=0 (a single bit having a value of 0)). EMPTY=1 (when $EMPTY_0=1$, $EMPTY_1=1$, and $EMPTY_2=1$) can indicate that FIFO unit 203 is empty. EMPTY=0 (when at least one of $EMPTY_0$, $EMPTY_1$, and $EMPTY_2$ is zero (logic 0)) can indicate that FIFO unit 203 is not empty.

FIFO unit 203 can be included in a system (e.g., apparatus 100) that may use an indication of FIFO full level (FIFO not empty) in a read clock domain, so that a read burst operation can be triggered. In such a system, the FIFO fill level information can be provided by FIFO unit 203 as follows. Fill_level=!$EMPTY_0$+!$EMPTY_1$+$EMPTY_M$ (where "!" means logical "not"; "+" means numerical addition (or summation); M=N−1; and N is the number of FIFO cells).

As shown in FIG. 3, read control circuit 243 can include a logic gate (e.g., AND gate) 345 and an inverter 347 that can operate to generate signal RD_EN based on signal EMPTY and signal READ. Signal RD_EN can contain information indicating whether FIFO cells 210, 211, and 212 can be allowed (e.g., enabled) to be read. Signal RD_EN can have different signal levels (e.g., voltage values) that can represent different values. For example, signal RD_EN can have a signal level corresponding to logic 1 (e.g., RD_EN=1) and a signal level corresponding to logic 0 (e.g., RD_EN=0 when READ=1 and EMPTY=1). RD_EN=1 (when READ=1 and EMPTY=0) can indicate that at least one of FIFO cells 210, 211, and 212 of FIFO unit 203 can be allowed to be read. RD_EN=0 (when READ=1 and EMPTY=1) can indicate that none of FIFO cells 210, 211, and 212 FIFO unit 203 can be allowed to be read.

As shown in FIG. 3, read control circuit 243 can include a logic gate (e.g., exclusive NOR gate) 353 and logic gates (e.g., exclusive OR gates) 355 and 357 that can operate to generate signals $RD\_PTR_0$, $RD\_PTR_1$, and $RD\_PTR_2$. In FIFO unit 203, FIFO cells 210, 211, and 212 can be sequentially selected (e.g., selected at a time) to be read. Signal $RD\_PTR_0$ can contain read pointer information that can indicate whether FIFO cell 210 is selected or not selected (unselected) to be read in a read operation of FIFO unit 203. Signal $RD\_PTR_0$ can have different signal levels (e.g., voltage values) that can represent different values. For example, signal $RD\_PTR_0$ can have a signal level corresponding to logic 1 (e.g., $RD\_PTR_0=1$ (a single bit having a value of 1)), and a signal level corresponding to logic 0 (e.g., $RD\_PTR_0=0$ (a single bit having a value of 0)). $RD\_PTR_0=1$ can indicate that FIFO cell 210 is the FIFO cell (among FIFO cells 210, 211, and 212) selected to be read in a read operation. $RD\_PTR_0=0$ can indicate that FIFO cell 210 is not selected (e.g., either FIFO cell 211 or 212 is selected) to be read in a read operation. Similarly, each of signals $RD\_PTR_1$ and $RD\_PTR_2$ can contain read pointer information that can indicate whether FIFO cell 211 and FIFO cell 212, respectively, is selected or not selected (unselected) to be read in a read operation of FIFO unit 203.

Each of signals $R_0$, $R_1$, and $R_2$ can carry information (e.g., read flag information) to indicate an occurrence of information being read from a respective FIFO cell among FIFO cells 210, 211, and 212. As shown in FIG. 3, signals $R_0$, $R_1$, and $R_2$ can be selectively provided to input nodes of respective logic gates 353, 355, and 357. Signal $R_0$ can have different signal levels (e.g., voltage values) that can represent different values. For example, signal $R_0$ can have a signal level corresponding to logic 1 (e.g., $R_0=1$ (a single bit having a value of 1)), and a signal level corresponding to logic 0 (e.g., $R_0=0$ (a single bit having a value of 0)). When (e.g., each time) information (e.g., new information) is read from FIFO cell 210, the value of the bit presented by signal $R_0$ can change (e.g., toggle) from its current value to another value (e.g., from a current $R_0=0$ to $R_0=1$, or from current $R_0=1$ to $R_0=0$). Similarly, when (e.g., each time) information (e.g., new information) is read from FIFO cell 211, the value of the bit presented by signal $R_1$ can change (e.g., toggle) from its current value to another value (e.g., from a current $R_1=0$ to $R_1=1$, or from a current value of $R_1=1$ to $R_1=0$). When (e.g., each time) information (e.g., new information) is read from FIFO cell 212, the value of the bit presented by signal $R_2$ can change (e.g., toggle) from its current value to another value (e.g., from a current value of $R_2=0$ to $R_2=1$, or from a current $R_2=1$ to $R_2=0$)

Read control circuit 243 can use logic gates 353, 355, and 357 to generate signals $RD\_PTR_0$, $RD\_PTR_1$, and $RD\_PTR_2$ having values based on the values of signals $R_0$, $R_1$, and $R_2$. FIFO unit 203 can determine which FIFO cell among FIFO cells 210, 211, and 212 is selected to be read based on the values of $RD\_PTR_0$, $RD\_PTR_1$, and $RD\_PTR_2$ during a read operation during. For example, during a particular read operation (e.g., read cycle), if $RD\_PTR_0=1$, $RD\_PTR_1=0$, and $RD\_PTR_2=0$ then, FIFO cell 210 is selected to be read in that particular read operation. In another example, if $RD\_PTR_0=0$, $RD\_PTR_1=1$, and $RD\_PTR_2=0$ then, FIFO cell 211 is selected to be read. Thus, based on the value (e.g., binary value of only single-bit) of one of signals $RD\_PTR_0$, $RD\_PTR_1$, and $RD\_PTR_2$ during a particular read operation, one (e.g., only one) of FIFO cells 210, 211, and 212 can be selected to be read in that particular read operation.

Thus, as described above with reference to FIG. 2 and FIG. 3, FIFO unit 203 can be an N-depth FIFO unit that includes N 1-depth FIFO cells 210, 211, and 212. Each of FIFO cells 210, 211, and 212 can receive signals from and provide signals to write control circuit 242 and read control circuit 243. FIFO unit 203 can selectively store information in and read information from FIFO cells 210, 211, and 212 in circular write and read operations, respectively.

Figure 4:
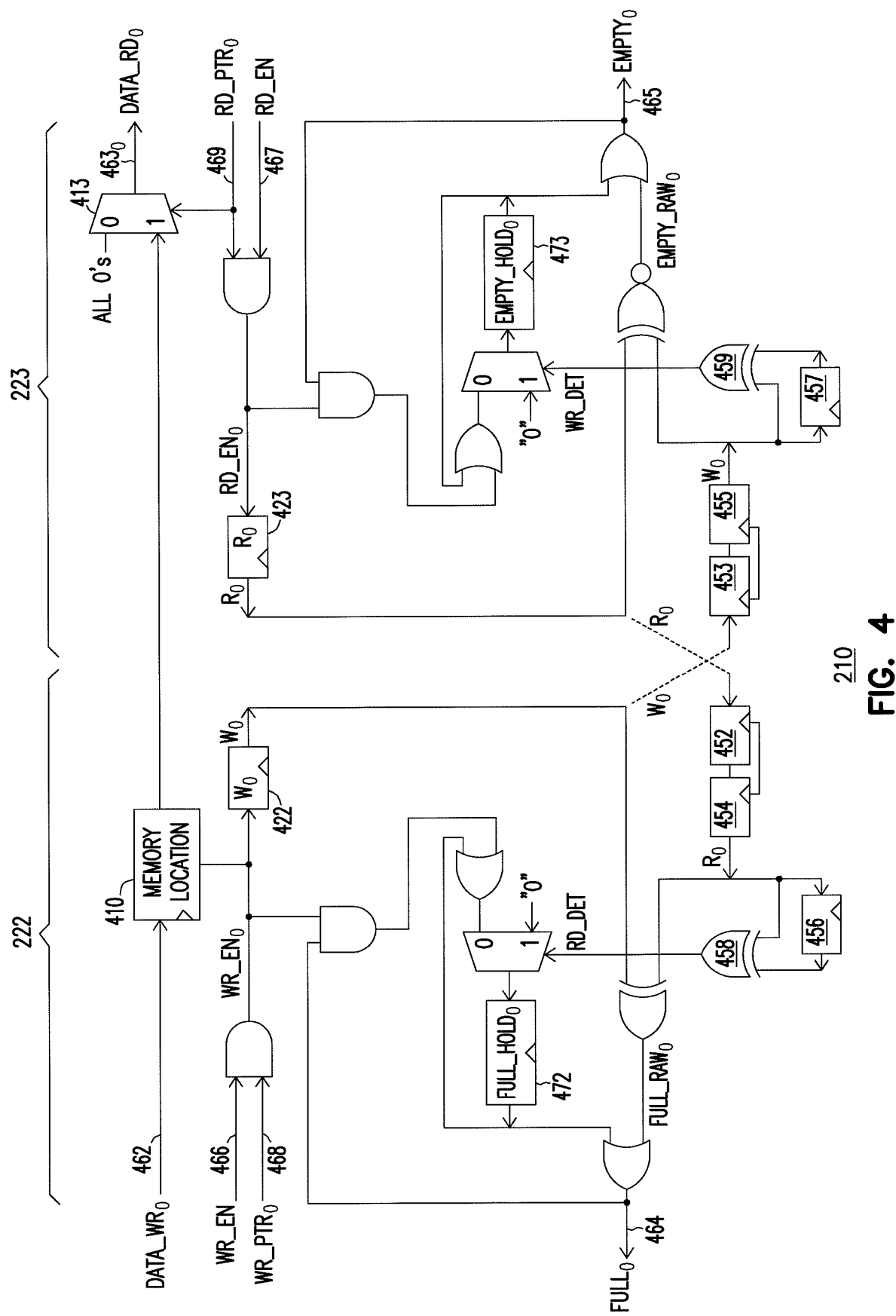
FIG. 4, FIG. 5, and FIG. 6 show schematic diagrams of respective FIFO cells of the FIFO unit of FIG. 3, according to some embodiments described herein.
Figure 5:
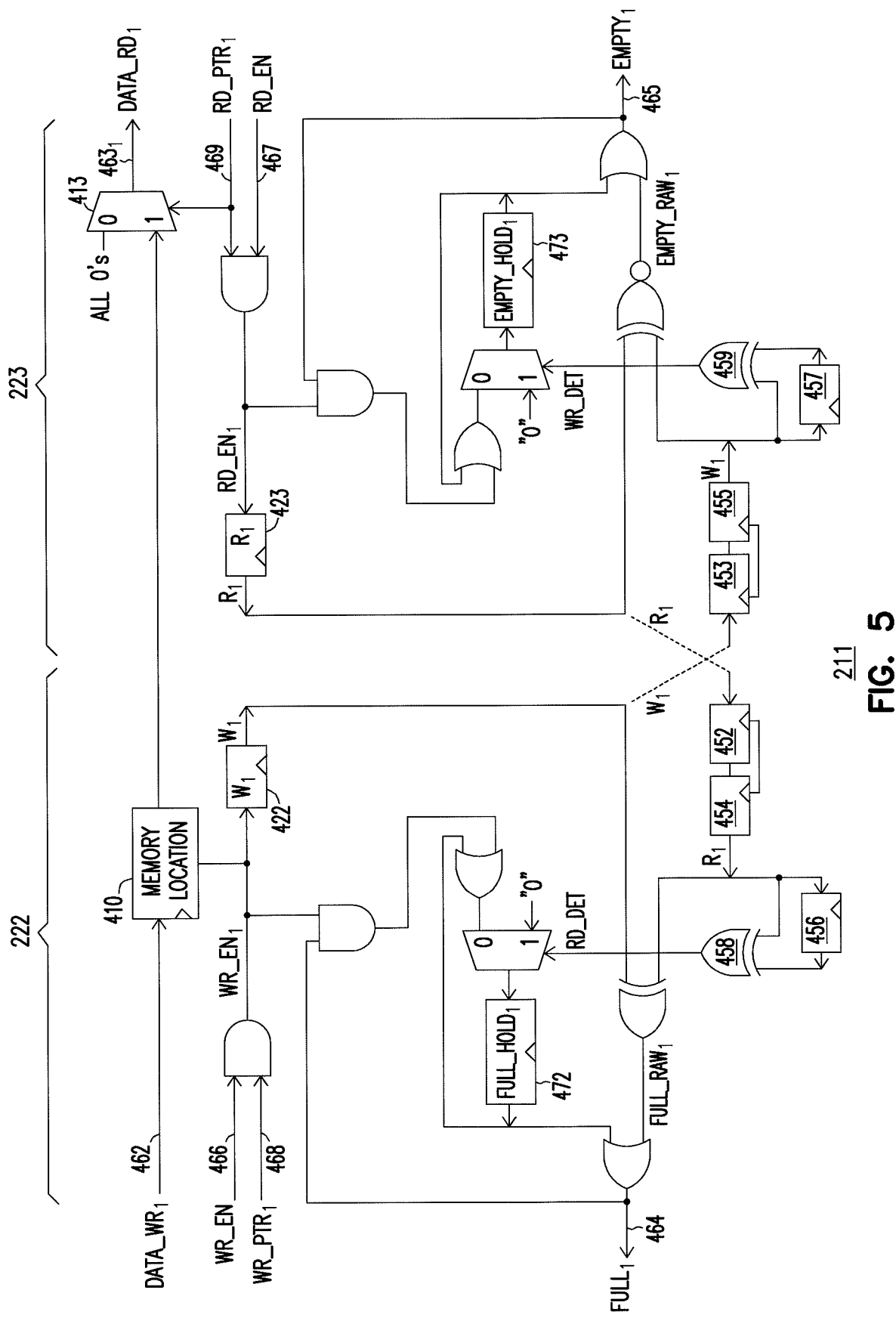
Figure 6:
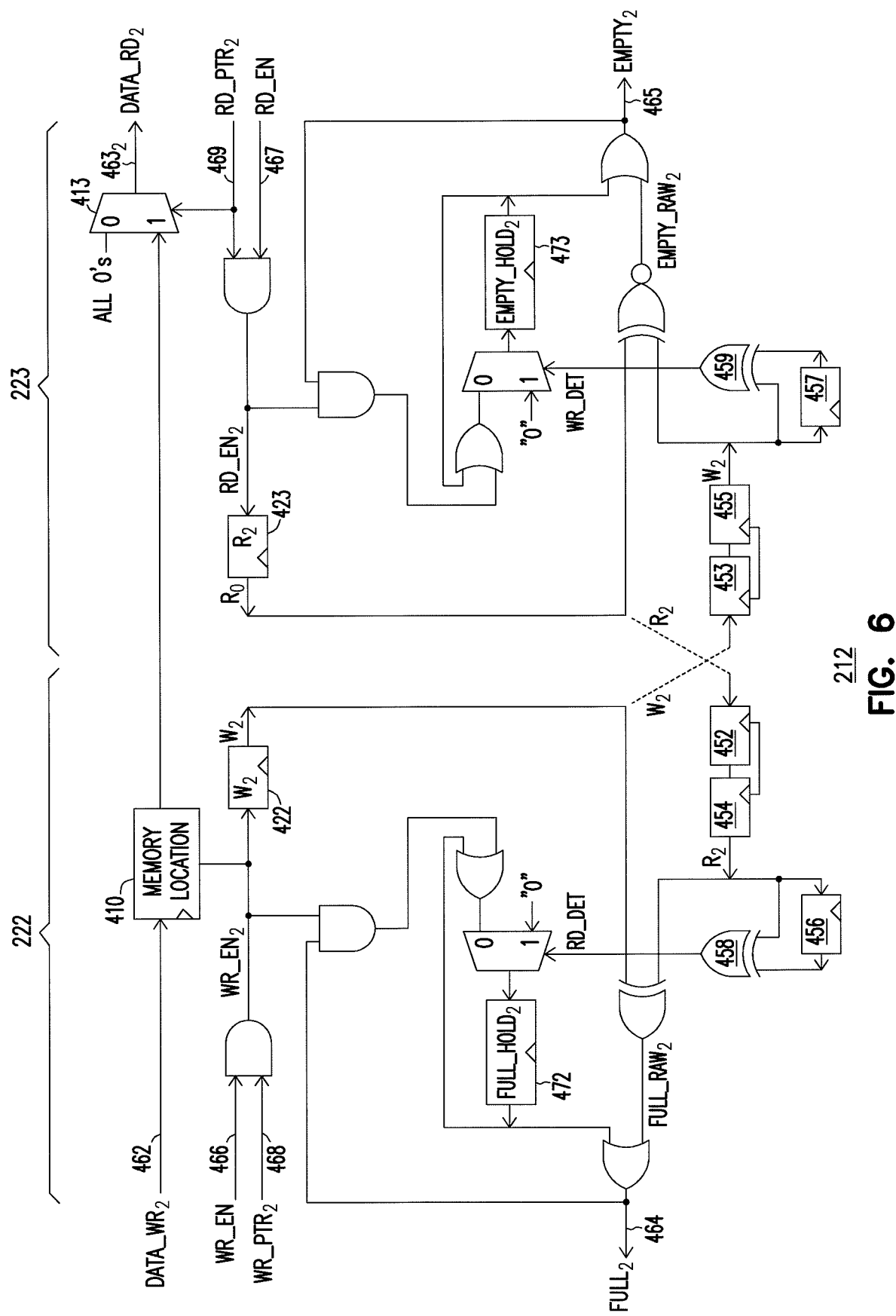

FIG. 4, FIG. 5, and FIG. 6 show schematic diagrams of FIFO cells 210, 211, and 212, respectively, of FIFO unit 203 of FIG. 3, according to some embodiments described herein. As shown in FIG. 4, FIG. 5, and FIG. 6, FIFO cells 210, 211, and 212 can have similar or identical elements, which are given the same labels. Thus, for simplicity, the description herein focuses on circuit elements and operations of FIFO cell 210 of FIG. 4. FIFO cells 211 and 212 (FIG. 5 and FIG. 6) have elements and operations similar to that of FIFO cell 210.

As shown in FIG. 4, FIFO cell 210 can operate with write clock domain 222 and read clock domain 223. For example, FIFO cell 210 can perform a write operation to store information in it based on timing of a clock signal (e.g., CLK_WR) from write clock domain 222, and a read operation to read the stored information based on timing of another clock signal (e.g., CLK_RD) from read clock domain 223. For simplicity, the clock signals (e.g., CLK_WR and CLK_RD) from write and read clock domains 222 and 223 provided to FIFO cell 210 (that are used as timing signal for some of the circuit elements of FIFO cell 210) are omitted from FIG. 4.

As shown in FIG. 4, FIFO cell 210 can include a memory location (e.g., a storage location) 410 to store information $DATA\_WR_0$ provided at in input 462 (e.g., input nodes that can be part of parallel conductive lines). Input 462 can be coupled to output 262 of input circuit 232 of FIG. 2. In FIG. 4, memory location 410 can include latches, memory cells, or other physical memory elements that can store information (e.g., store X bits of data information). Information $DATA\_WR_0$ can be based on information DATA_WR (FIG. 3) at a particular time. Information $DATA\_WR_0$ can include a binary word, which can include a number of bits (e.g., X bits). Information $DATA\_WR_0$ can be stored in memory location 410 during a write operation performed by FIFO cell 210. Information $DATA\_WR_0$ can be read from memory location 410 during a read operation performed by FIFO cell 210.

As shown in FIG. 4, FIFO cell 210 can include a node 464 to provide signal $FULL_0$, a node 466 receive signal WR_EN, and a node 468 to receive signal $WR\_PTR_0$. $FULL_0=1$ (e.g., $W_0$ and $R_0$ have different values) can indicate that FIFO cell 210 is full. $FULL_0=0$ (e.g., when $W_0$ and $R_0$ have the same value) can indicate that FIFO cell 210 is not full. After information is stored in memory location 410, FIFO cell 210 causes $FULL_0=1$ and FIFO cell 210 may not store information (not available to store new information). After information is read from memory location 410, FIFO cell 210 causes $FULL_0=0$, and FIFO cell 210 may store information again (available to store new information). In FIG. 4, information can be stored in memory location 410 when $FULL_0=0$, $WR\_EN_0=1$, and $WR\_PTR_0=1$. The structure of FIFO cell 210 can also allow information to be stored in memory location 410 when FULL=0, $FULL_0=1$. $WR\_EN_0=1$, and $WR\_PTR_0=1$.

The value of signal $WR\_EN_0$ can be based on the values of signals WR_EN and WR_PTR (provided by write control circuit 242 of FIG. 3). Signal $WR\_EN_0$ can have different signal levels (e.g., voltage values) that can represent different values. For example, signal $WR\_EN_0$ can have a signal level corresponding to logic 1 (e.g., $WR\_EN_0=1$), and a signal level corresponding to logic 0 (e.g., $WR\_EN_0=0$).

When $WR\_EN_0=1$ (when WR_EN=1 and WR_PTR=1), memory location 410 is allowed (e.g., is enabled) to capture and store information $DATA\_WR_0$ based on timing (e.g., rising edge, falling edge, or both edges) of a clock signal from write clock domain 222. When $WR\_EN_0=0$ (e.g., when WRITE=0 or FULL=1 or $WR\_PTR_0=0$), memory location 410 is prevented (e.g., is disabled) from capturing and storing new information. Information (e.g., previously stored information) in memory location 410 can remain unchanged when $WR\_EN_0=0$.

As shown in FIG. 4, FIFO cell 210 can include an output $463_0$ (e.g., output nodes that can be part of parallel conductive lines) to provide information read from FIFO cell 210 during a read operation. Similarly, FIFO cell 211 (FIG. 5) and FIFO cell 212 (FIG. 6) can include outputs $463_1$ and $463_2$, respectively. Outputs $463_0$, $463_1$, and $463_2$ (FIG. 4, FIG. 5, FIG. 6) can be parts of or coupled to outputs $263_0$, $263_1$, and $263_2$, respectively, of FIG. 2.

As shown in FIG. 4, FIFO cell 210 can include a node 465 to provide signal $EMPTY_0$, a node 467 receive signal RD_EN, and a node 469 to receive signal $RD\_PTR_0$. $EMPTY_0=1$ (e.g., when $W_0$ and $R_0$ have the same value) can indicate that FIFO cell 210 is empty. $Empty_0=0$ (e.g., when $W_0$ and $R_0$ have different values) can indicate that FIFO cell 210 is not empty. After information is read from memory location 410, FIFO cell 210 causes $EMPTY_0=1$, and FIFO cell 210 may not be read (e.g., information in memory location 410 is invalid) until after new information is stored in memory location 410. After information (new information) is stored in memory location 410, FIFO cell 210 causes $EMPTY_0=0$, and FIFO cell 210 may be read again (e.g., information in memory location 410 is valid). Information can be read from FIFO cell 210 when $EMPTY_0=0$, $RD\_EN_0=1$, and $RD\_PTR_0=1$. The structure of FIFO cell 210 can also allow information to be read from memory location 410 when EMPTY=0, $EMPTY_0=1$, $RD\_EN_0=1$, and $RD\_PTR_0=1$.

The value of signal $RD\_EN_0$ can be based on the values of signals RD_EN and $RD\_PTR_0$ (provided by write control circuit 242 of FIG. 3). Signal $RD\_EN_0$ can have different signal levels (e.g., voltage values) that can represent different values. For example, signal $RD\_EN_0$ can have a signal level corresponding to logic 1 (e.g., $RD\_EN_0=1$), and a signal level corresponding to logic 0 (e.g., $RD\_EN_0=0$). When $RD\_EN_0=1$ (when RD_EN=1 and RD_PTR=1), memory location 410 is allowed (e.g., is enabled) to be read based on timing (e.g., rising edge, falling edge, or both edges) of a clock signal from read clock domain 223. When $RD\_EN_0=0$ (e.g., when READ=0 or EMPTY=1 or $RD\_PTR_0=0$), memory location 410 is prevented (e.g., is disabled) from being read.

Signal $RD\_PTR_0$ can contain read pointer information that can indicate whether FIFO cell 210 is selected or not selected (unselected) to be read in a read operation of FIFO unit 203. Signal $RD\_PTR_0$ can have different signal levels (e.g., voltage values), such as a signal level corresponding to logic 1 (e.g., $RD\_PTR_0=1$ (a single bit having a value of 1)) and a signal level corresponding to logic 0 (e.g., $RD\_PTR_0=0$ (a single bit having a value of 0). $RD\_PTR_0=1$ indicates that FIFO cell 210 is the FIFO cell (among FIFO cells 210, 211, and 212) selected to provide information (information previously stored in memory location 410) in a read operation. $RD\_PTR_0=0$ indicates that FIFO cell 210 is not selected (e.g., either FIFO cell 211 or 212 is selected) to provide information in a read operation.

As shown in FIG. 4, FIFO cell 210 can include a selector (e.g., multiplexer (MUX)) 413 to provide information $DATA\_RD_0$ at the output (e.g., MUX output node (or nodes)) of selector 413. Selector 413 can operate to select either information having bits of zeros (indicted as "ALL 0's" in FIG. 4B) or information (e.g., $DATA\_WR_0$) stored in memory location 410, depending on the value of signal $RD\_PTR_0$ (depending on $RD\_PTR_0=0$ or $RD\_PTR_0=1$). Thus, the value of information $DATA\_RD_0$ can be either all zeros (which are not stored in memory location 410 (e.g., all ground signals) or the value of information $DATA\_WR_0$ stored in memory location 410. The value of information $DATA\_RD_0$ is all zeros when FIFO cell 210 is not selected to be read ($RD\_PTR_0=1$) during a read operation of FIFO unit 203 (e.g., when either FIFO cell 211 or 212 is selected to be read). The value of information $DATA\_RD_0$ is the value of information $DATA\_WR_0$ stored in memory location when FIFO cell 210 is selected to be read (e.g., when FIFO cells 211 and 212 are not selected to be read).

Providing all zeros as the value for information DATA_RD$_0$ (output data of FIFO cell 210) allows the value of information DATA_RD (output data of FIFO unit 203 of FIG. 3) to be the value of the information stored in memory location 410 of a selected FIFO cell (among FIFO cells 210, 211, and 212). For example, logic circuitry 233a (FIG. 2) can perform a bit-wise OR operation on the bits of information DATA_RD$_0$ (FIG. 4), DATA_RD$_1$ (FIG. 5), and DATA_RD$_2$ (FIG. 6). The bit-wise OR operation can provide information DATA_RD having the value of the information (DATA_RD$_0$, DATA_RD$_1$, or DATA_RD$_2$) read from the selected FIFO cell (FIFO cell 210, 211, or 212).

The following examples assumes that FIFO cells 210, 211, and 212 (FIG. 4, FIG. 5, and FIG. 6, respectively) are configured to store X=8 bits. The information stored in memory location 410 of a respective FIFO cell (among FIFO cells 210, 211, and 212) are assumed as follows: DATA_WR$_0$=10101010 (stored in memory location 410 of FIFO cell 210 of FIG. 4); DATA_WR$_1$=11100111 (stored in memory location 410 of FIFO cell 211 of FIG. 5); and DATA_WR$_2$=11110000 (stored in memory location 410 of FIFO cell 212 of FIG. 6).

During an example read operation of FIFO unit 203 (FIG. 3), if FIFO cell 210 of FIG. 4 is selected (RD_PTR$_0$=1), and FIFO cells 211 and 212 of FIG. 5 and FIG. 6, respectively, are not selected (RD_PTR$_0$=0, and RD_PTR$_0$=0), then the values of information read from respective FIFO cells 210, 211, and 212 are as follows. In FIG. 4, DATA_RD$_0$=10101010 (selected from memory location 410 because RD_PTR$_0$=1) is provided at output 463$_0$. In FIG. 5, DATA_RD$_1$=0000000 (all zeros because RD_PTR$_1$=0) is provided at output 463$_1$. In FIG. 6, DATA_RD$_2$=0000000 (all zeros because RD_PTR2=0) is provided at output 463$_2$. In this example, the bit-wise OR operation from logic circuitry 233a (FIG. 2) provides DATA_RD=10101010, which is the value of information DATA_WR$_0$ (from selected FIFO cell 210 in this example).

In another example read operation, if FIFO cell 211 (FIG. 5) is selected (RD_PTR$_1$=1), and FIFO cell 210 (FIG. 4) and FIFO cell 212 (FIG. 6) are not selected (RD_PTR$_0$=0, and RD_PTR2=0), then the values of information read from respective FIFO cells 210, 211, and 212 are as follows. In FIG. 4, DATA_RD$_0$=00000000 (all zeros) is provided at output 463$_0$. In FIG. 5, DATA_RD$_1$=11100111 (selected from memory location 410 of FIFO cell 211) is provided on output 463$_1$. In FIG. 6, DATA_RD$_2$=0000000 (all zeros) is provided on output 463$_2$. In this example, the bit-wise OR operation from logic circuitry 233a (FIG. 2) provides DATA_RD=11100111, which is the value of information DATA_WR$_1$ (from the selected FIFO cell 211 in this example).

In another example read operation, if FIFO cell 212 is selected (RD_PTR2=1), and FIFO cell 210 (FIG. 4) and FIFO cell 211 (FIG. 5) are not selected (RD_PTR$_0$=0, and RD_PTR$_1$=0), then the values of information read from respective FIFO cells 210, 211, and 212 are as follows. In FIG. 4, DATA_RD$_0$=00000000 (all zeros) is provided on output 463$_0$. In FIG. 5, DATA_RD$_1$=0000000 (all zeros) is provided on output 463$_1$. In FIG. 6, DATA_RD$_2$=11110000 (selected from memory location 410 of FIFO cell 212) is provided on output 463$_2$. In this example, the bit-wise OR operation from logic circuitry 233a (FIG. 2) provides DATA_RD=11110000, which is the value of information DATA_WR$_2$ (from the selected FIFO cell 212 in this example).

The following description discusses other signals of FIFO cell 210 in FIG. 4. As shown in FIG. 4, FIFO cell 210 can include a flip-flop (e.g., toggle flip-flop) 422 to store the value of signal W$_0$. Flip-flop 422 can store a value of a bit (e.g., only one bit) that presents the value of signal W$_0$. Flip-flop 422 can toggle when (e.g., each time) information is stored in memory location 410. As described above, information can be stored in memory location 410 when WR_EN$_0$=1. Thus, when WR_EN$_0$=1, flip-flop 422 can toggle such that the value of information W$_0$ can change from its current value (binary value) to another value (binary value). This means that when flip-flop 422 toggles, the value of information W$_0$ can change from W$_0$=0 (e.g., current value) to W$_0$=1 or can change from W$_0$=1 (e.g., current value) to W$_0$=0. As shown in FIG. 4, information W$_0$ can be provided to (sent to) flip-flops (e.g., back-to-back flip-flops) 453 and 455 in read clock domain 223.

FIFO cell 210 can generate a signal FULL_RAW$_0$ that can contain information to indicate whether FIFO cell 210 is full (or not full). FULL_RAW$_0$=1 can indicate that FIFO cell 210 is full. FULL_RAW$_0$=0 can indicate that FIFO cell 210 is not full. The value of signal FULL_RAW$_0$ is based on (e.g., XOR values) of signals W$_0$ and R$_0$.

FIFO cell 210 can include a register 472 (which can include a D flip-flop) to hold a value. The value of signal FULL$_0$ can be either the value of signal FULL_RAW$_0$ or the value of register 472 (the value of FULL_HOLD$_0$). Register 472 can store information FULL_HOLD$_0$ that can include a single bit (only one bit). Register 472 can be used to correct the value of information FULL$_0$. For example, the value of FULL_HOLD$_0$ in register 472 can normally remain at zero (e.g., FULL_HOLD$_0$=0), but it can be change (e.g., set) to FULL_HOLD$_0$=1 (binary 1) when a write operation has been performed on FIFO cell 210 while FULL$_0$=1. This situation can happen because signals R$_0$, R$_1$, and R$_2$ may have different propagation delays (e.g., wire delays) before they reach a first flip-flop (e.g., 452) in write clock domain 222. The value of FULL_HOLD$_0$ can be reset to zero FULL_HOLD$_0$=0) when RD_DET=1. FIFO cell 210 can generate a signal RD_DET based on signal R$_0$ provided to a combination of a register 456 (e.g., delay register) and an exclusive-OR (XOR) logic gate 458. Signal RD_DET can contain read detection information, which can indicate that a read operation has been performed at FIFO cell 210 (e.g., R$_0$ changes its value). The value of signal RD_DET can normally be RD_DET=0 and can change to RD_DET=1 when information R$_0$ changes. Then, signal RD_DET can change back to RD_DET=0 after a time delay (based on the time delay of delay register 456).

As shown in FIG. 4, FIFO cell 210 can include a flip-flop (e.g., toggle flip-flop) 423 to store the value of signal R$_0$. Flip-flop 423 can store a value of a bit (e.g., only one bit) that presents the value of signal R$_0$. Flip-flop 423 can toggle when (e.g., each time) information is read from memory location 410. As described above, information can be read from memory location 410 when RD_EN$_0$=1. Thus, when RD_EN$_0$=1, flip-flop 423 can toggle such that the value of information R$_0$ can change from its current value (binary value) to another value (binary value). This means that when flip-flop 423 toggles, the value of information R$_0$ can change from R$_0$=0 (e.g., current value) to R$_0$=1 or can change from R$_0$=1 (e.g., current value) to R$_0$=0. As shown in FIG. 4, information R$_0$ can be provided to (send to) flip-flops (e.g., back-to-back flip-flops) 452 and 454 in write clock domain 222.

FIFO cell 210 can generate a signal EMPTY_RAW$_0$ that can contain information to indicate whether FIFO cell 210 is empty (or not empty). EMPTY_RAW$_0$=1 can indicate that FIFO cell 210 is empty. EMPTY_RAW$_0$=0 can indicate that FIFO cell 210 is not empty. The value of signal EMPTY_RAW$_0$ is based on (e.g., XOR values) of signals W$_0$ and R$_0$.

FIFO cell 210 can include a register 473 (which can include a D flip-flop) to hold a value. The value of signal EMPTY$_0$ can be either the value of signal EMPTY_RAW$_0$ or the value of register 473 (the value of EMPTY_HOLD$_0$). Register 473 can store information EMPTY_HOLD$_0$ that can include a single bit (only one bit). Register 473 can be used to correct the value of information EMPTY$_0$. For example, the value of EMPTY_HOLD$_0$ in register 473 can normally remain at zero (e.g., EMPTY_HOLD$_0$=0), but it can be changed (e.g., set) to EMPTY_HOLD$_0$=1 (binary 1) when a read operation has been performed on FIFO cell 210 while EMPTY$_0$=1. This situation can happen because signals W$_0$, W$_1$, and W$_2$ may have different propagation delays (e.g., wire delays) before they reach a first flip-flop (e.g., 453) in read clock domain 223. The value of EMPTY_HOLD$_0$ can be reset to zero EMPTY_HOLD$_0$=0) when WR_DET=1.

FIFO cell 210 can generate a signal WR_DET based on signal W$_0$ provided to a combination of a register 457 (e.g., delay register) and an exclusive-OR (XOR) logic gate 459. Signal WR_DET can contain write detection information, which can indicate that a write operation has been performed at FIFO cell 210 (e.g., W$_0$ changes its value). The value of signal WR_DET can normally be WR_DET=0 and can change to WR_DET=1 when information R$_0$ changes. Then, signal WR_DET can change back to WR_DET=0 after a time delay (based on the time delay of register 457). The functions of registers 472 and 473 are further described below after a description of example write and read operations of FIFO cell 210.

Example write and read operations of FIFO cell 210 are as follows. At reset (e.g., initial setting at power-on of FIFO unit 203), the values in both registers 472 and 473 can be set to zero, such that FULL_HOLD$_0$=0 and EMPTY_HOLD$_0$=0. At reset, the values in both flip-flops 422 and 423 can also be set to zero, such that W$_0$=0 and R$_0$=0. This results in FULL$_0$=0 (FIFO cell 210 is not full) and EMPTY$_0$=1 (FIFO cell 210 is empty). FIFO cells 211 and 212 (FIG. 5 and FIG. 6, respectively) can also be reset when FIFO cell 210 is reset. Thus, at reset, W$_0$=W$_1$=W$_2$=0; and R$_1$=R$_1$=R$_2$=0. Therefore, WR_PTR$_0$=1 (generated by logic gate 352 in FIG. 3) and RD_PTR$_0$=1 (generated by logic gate 353 in FIG. 3). Thus, after reset, FIFO cell 210 is selected to store information and selected to be read.

In FIG. 4, in a first write operation (e.g., initial write operation immediately after reset), when information WRITE=1 is received at FIFO cell 210, WR_EN changes from WR_EN=0 to WR_EN=1 (because WRITE=1 and FULL=0). This causes WR_EN$_0$=1 and allows information DATA_WR$_0$ to be captured and stored in memory location 410.

Flip-flop 422 toggles when WR_EN$_0$ changes. Thus, signal W$_0$ changes from W$_0$=0 (from reset) to W$_0$=1. This causes FULL$_0$ to change from FULL$_0$=0 (e.g., W$_0$=0 and R$_0$=0 before the first write operation) to FULL$_0$=1 (e.g., W$_0$=1 and R$_0$=0 after the first write operation and before a first read operation). This means that FIFO cell 210 is full (e.g., FIFO cell 210 is unavailable to store new information after the first write operation).

Signal W$_0$ in the first write operation is sent to flip-flops 453 and 455 (in read clock domain 223). Since W$_0$=1 (after the first write operation) and R$_0$=0 (from reset), EMPTY$_0$ changes from EMPTY$_0$=1 (e.g., W$_0$=0 and R$_0$=0 before the first write operation) to EMPTY$_0$=0 (e.g., W$_0$=1 and R$_0$=0 after the first write operation). This means that FIFO cell 210 is not empty (e.g., FIFO cell 210 is available to be read) after the first write operation.

In a first read operation (e.g., initial read operation after reset and after the first write operation), when information READ=1 is received at FIFO cell 210, RD_EN changes from RD_EN=0 to RD_EN=1 (because READ=1 and EMPTY=0). This causes RD_EN$_0$=1 and allows information in memory location 410 to be read.

Flip-flop 423 toggles when RD_EN$_0$ changes from 0 to 1. Thus, signal R$_0$ changes from R$_0$=0 to R$_0$=1. This causes EMPTY$_0$ to change from EMPTY$_0$=0 (e.g., W$_0$=1 and R$_0$=0) to EMPTY$_0$=1 (e.g., W$_0$=1 and R$_0$=1 after the first read operation). This means that FIFO cell 210 is empty again (e.g., FIFO cell 210 is unavailable to be read).

Signal R$_0$ in the first read operation is sent to flip-flops 452 and 454 (in write clock domain 222). Since R$_0$=1 (after the first read), FULL$_0$ changes from FULL$_0$=1 (value after the first write operation) to FULL$_0$=0 (e.g., W$_0$=1 and R$_0$=1 after the first read operation). This means that FIFO cell 210 is not full and is again available to be store information (e.g., store new information after FIFO cells 210 is read).

The write and read operation performed on FIFO cell 210 (as described in the above example) can repeat after FIFO cells 211 and 212 are selected (e.g., sequentially selected after FIFO cell 210 is selected) to store information. Each of FIFO cells 211 and 212 can have operations similar to that of FIFO cell 210 described above.

The functions of register 472 in each of FIFO cells 210, 211, and 212 (FIG. 4, FIG. 5, and FIG. 6) can enhance the operations of FIFO cells 210, 211, and 212 by preventing signals FULL$_0$, FULL$_1$, and FULL$_2$, respectively, from having incorrect values when signals R$_0$, R$_1$, and R$_2$ have different propagation delays. Similarly, the functionality of register 473 in each of FIFO cells 210, 211, and 212 can enhance the operations of FIFO cells 210, 211, and 212 by preventing signals EMPTY$_0$, EMPTY$_1$, and EMPTY$_2$, respectively, from having incorrect values when signals W$_0$, W$_1$, and W$_2$ have different propagation delays.

As an example, after reset, W$_2$W$_1$W$_0$=000 (binary value), and R$_2$R$_1$R$_0$=000. After three successive write operations, W$_2$W$_1$W$_0$=111. This example also assumes that signals W$_0$, W$_1$, and W$_2$ have different propagation delays, such that signal W$_0$ has a greater propagation delay (in read clock domain 223) than each of signals W$_1$ and W$_2$. For example, signal W$_0$ takes three read clock periods of propagation delay before it reaches flip-flops 453 and 455 (FIG. 4), and each of signals W$_1$ and W$_2$ takes about one read clock period of propagation delay before they reach their respective flip-flops 453 and 455 (FIG. 4 and FIG. 5). Since the write operations are circular, signal W$_0$ will toggle first, then signal W$_1$, and then W$_2$ (e.g., first, second, and third write operations on FIFO cells 210, 211, and 212, respectively). As assumed above, signal W$_0$ has a greater propagation delay than each of signals W$_1$ and W$_2$. Thus, the value of W$_0$ (three period delay) reaches corresponding flip-flops (e.g., 453 and 455 in FIG. 4) in read clock domain 223 after the values of W$_1$ and W$_2$ (one period delay) reach their respective flip-flops 453 and 455 in the read clock domain 223. Therefore, the values of W$_2$W$_1$W$_0$ are 011 in read clock domain 223. This results in EMPTY_RAW$_0$=1, EMPTY_RAW$_1$=0, and EMPTY_RAW$_2$=0.

In the absence of register 473, incorrect values can occur, such that EMPTY$_0$=1, EMPTY$_1$=0, and EMPTY$_2$=0 (because EMPTY_RAW$_0$=1, EMPTY_RAW$_1$=0, and EMPTY_RAW$_2$=0). Since FIFO unit 203 is not empty, any read operation can make R$_0$=1, causing EMPTY_RAW$_0$=0, thereby causing $EMPTY_0=0$. This results in incorrect value of $EMPTY_0$ because FIFO cell 210 has been read, and the value of $EMPTY_0$ should be 1 ($EMPTY_0=1$)

In the presence of register 473, an incorrect value of $EMPTY_0$ can be avoided. As shown in FIG. 4, the value of register 473 will be set to 1 (EMPTY_HOLD=1) if a read operation is performed at FIFO cell 210 when $EMPTY_0=1$. When signal $W_0$ ($W_0=1$ in this example) is detected (e.g., WR_DET=1) after the propagation delay, $EMPTY\_RAW_0=1$. Thus, the value of register 473 can be reset to 0 (e.g., EMPTY_HOLD=0). This can prevent signals $EMPTY_0$, $EMPTY_1$, $EMPTY_2$, $FULL_0$, $FULL_1$, and $FULL_2$ from having incorrect values and maintain proper operations of FIFO cells 210, 211, and 212.

The asynchronous FIFO units (e.g., FIFO units 103, 203, 1103 (FIG. 11), and 1203 (FIG. 12) described herein can have improvements over some conventional FIFO circuitry. For examples, asynchronous FIFO operations in many conventional asynchronous FIFO circuitry use gray code for multiple bits that represent the value of each of the write and read pointer information that passed between read and write clock domains. As is known to those skilled in the art, gray code is a binary numbering system where two successive values have only one bit of different bit values. Thus, such conventional asynchronous FIFO operations rely on the assumption that among the gray-coded bits that represent the value of the write pointer information, only one bit changes its bit value when the write pointer information is passed from a write clock domain to a read clock domain. Similarly, conventional asynchronous FIFO operations also rely on the assumption that among the gray-coded bits that represent the value of the read pointer information, only one bit changes its bit value when the read pointer information is passed from a read clock domain to a write clock domain.

However, operational factors such as propagation delay and timing skews among bits of gray-code write pointer may cause the first flip-flop of more than one synchronizers (e.g., a synchronizer can be similar to a combination of flip-flops 453 and 455) in read clock domain to undergo meta-stable condition, which after a meta-stable resolution time, result in incorrect gray-code write pointer value being detected. Similarly, the mentioned operation factors may also cause the first flip-flop of more than one synchronizers (e.g., a synchronizer can be similar to a combination of flip-flops 452 and 454) in write clock domain to undergo meta-stable condition, which after a meta-stable resolution time, result in incorrect gray-code read pointer being detected. Such incorrect values in conventional asynchronous FIFO circuitry can lead to unexpected device or system behavior including functional failures.

Some conventional techniques try to prevent such incorrect values for the write and read pointer information. However, such conventional techniques can be risky and time consuming because timing constraints in such techniques are complex and prone to errors. Such conventional techniques may fail to work as expected throughout design implementation flow. Plus, such conventional techniques may be inapplicable to designs that have multi-clock period routing delay and timing skews when passing the write and read pointer information between different clock domains.

In the techniques described herein (e.g., as described above with reference to FIG. 2 though FIG. 6), incorrect values for write pointer information (e.g., $WR\_PTR_0$, $WR\_PTR_1$, and $WR\_PTR_2$) and read pointer information (e.g., $RD\_PTR_0$, $RD\_PTR_1$, and $RD\_PTR_2$) may be avoided. For example, as described above, one bit (e.g., $W_0$, $W_1$, $W_2$, $R_0$, $R_1$, or $R_2$) instead of multiple bits is passed between write clock domain 222 and read clock domain 223, and that one bit is used to provide values for write and read pointer information. By using one bit (e.g., $W_0$, $W_1$, $W_2$, $R_0$, $R_1$, or $R_2$) as described herein, the chance of multi-bit value change (e.g., gray-coded bits used in conventional asynchronous FIFO operations) can be avoided. Thus, incorrect values for pointer information (write, read, or both pointer information) can be avoided in the FIFO units described herein. This makes the asynchronous FIFO units (e.g., FIFO units 103 and 203) described herein have improvements (e.g., avoidance of unexpected system behavior including functional failures) over some conventional asynchronous FIFO operations.

Further, using gray-coded bits for pointer information restricts the FIFO depth of conventional FIFO circuit to a power of two. This can result in overdesign. Some conventional techniques try to deal with such a restriction. However, such conventional techniques may be unfit for some design (e.g., synthesis) development.

In the asynchronous FIFO units described herein, the FIFO depth (N) is unrestricted to the power of two. For example, as described above, the FIFO depth of FIFO cell 203 can be an odd number (not a power of two) or an even number (may or may not be a power of two). The techniques described herein allow a simple way to select the FIFO depth for the described asynchronous FIFO unit. As described above, the FIFO depth (N) of the described asynchronous FIFO unit is equal to the number of the FIFO cells (e.g., FIFO cells 210, 211, and 212) of the asynchronous FIFO unit (e.g., FIFO unit 203). Thus, the FIFO depth (N) of the described asynchronous FIFO unit can be selected by simply selecting (e.g., adding or subtracting) the number of the FIFO cells.

Figure 7:
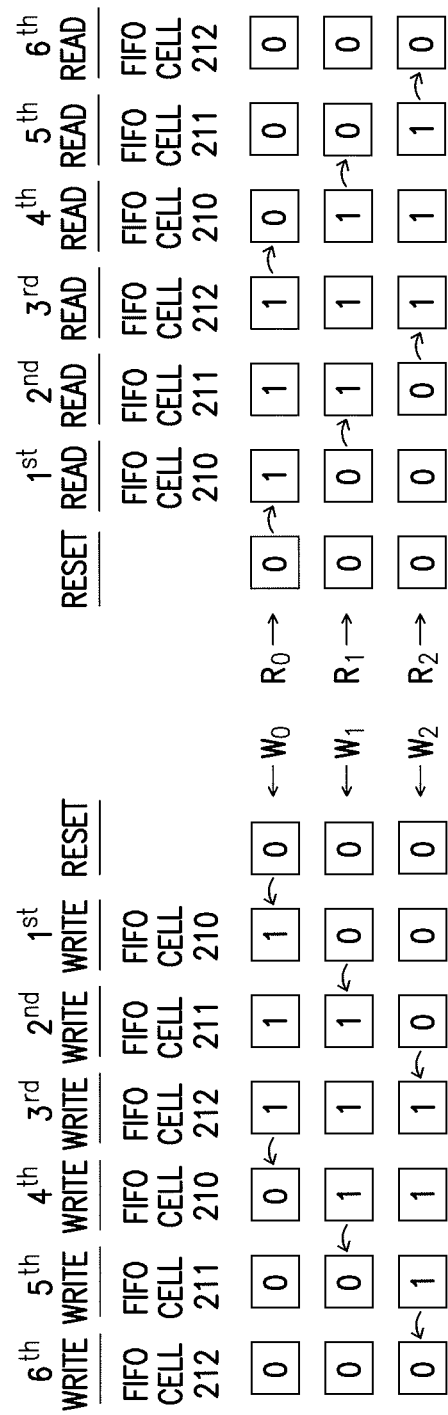
FIG. 7 is chart (e.g., table) showing values of some of the signals (e.g., write and read flag information) of the FIFO cells of FIG. 3 through FIG. 6 during a reset operation and during example circular write operations and read operations performed in the FIFO cells, according to some embodiments described herein.

FIG. 7 is chart showing values of signals $W_0$, $W_1$, $W_2$, $R_0$, $R_1$, and $R_2$ during a reset operation and during example circular write operation and read operations performed in FIFO cells 210, 211, and 212 of FIG. 3 through FIG. 6, according to some embodiments described herein. As shown in FIG. 7, at reset, the values of $W_0$, $W_1$, $W_2$, $R_0$, $R_1$, and $R_2$ can be set to zero. For example, flip-flops 442 and 443 (FIG. 4, FIG. 5 and FIG. 6) of each of FIFO cells 210, 211, and can be set to store a bit having a value of zero (e.g., $W_0=0$, $W_1=0$, $W_2=0$, $R_0=0$, $R_1=0$, and $R_2=0$).

In a circular write operation, FIFO cells 210, 211, and 212 can be selected (after reset) to store different information in a sequential order, starting at a first FIFO cell (e.g., FIFO cell 210) and then go back to the first FIFO cell (e.g., FIFO cell 210) after the last FIFO cell (e.g., FIFO cell 212) is selected. As shown in FIG. 7, six write operations (e.g., six write cycles) are performed after the reset, starting from the first write operation (first write) through the sixth write operation (sixth write). FIFO cells 210, 211, and 212 are sequentially selected in the first, second, and third write operations, respectively, to store information. After the third write operation, FIFO cells 210, 211, and 212 are sequentially selected again in the fourth, fifth, and sixth write operations, respectively, to store information. After the sixth write operation, the selection process can repeat for subsequent write operations. As described above with reference to FIG. 2 through FIG. 6, write control circuit 242 (FIG. 3) can generate signals (e.g., write pointer information) $WR\_PTR_0$, $WR\_PTR_1$, and $WR\_PTR_2$ based on signals $W_0$, $W_1$, and $W_2$ to control the selection of a particular FIFO cell among FIFO cells 210, 211, and 212 in during a write operation.

In FIG. 7, the value of a particular signal among signals $W_0$, $W_1$, and $W_2$ can change (toggle) when (e.g., each time) information is stored in a corresponding FIFO cell in a write operation. The value of a particular signal among signals $W_0$, $W_1$, and $W_2$ can remain unchanged if information is not stored in a corresponding FIFO cell in a write operation.

For example, as shown in FIG. 7, in the first write operation, signal $W_0$ changes from 0 to 1 when FIFO cell 210 stores information in the first write operation. In the first write operation, each of signals $W_1$ and $W_2$ remains unchanged at 0 because FIFO cells 211 and 212 are not selected to store information the first write operation.

In the second write operation, signal $W_0$ remains unchanged at 1 because FIFO cell 210 is not select to store information in the second write operation. In the second write operation, signal $W_1$ changes from 0 to 1 when FIFO cell 211 stores information the second write operation. In the second write operation, signal $W_2$ remains unchanged at 0 because FIFO cell 212 is not select to store information in the second write operation.

In the third write operation, each of signals $W_0$ and $W_1$ remains unchanged at 1 because FIFO cells 210 and 211 are not selected to store information in the third write operation. In the third write operation, signal $W_2$ changes from 0 to 1 when FIFO cell 212 stores information in the third write operation.

In each of subsequent write operations (e.g., the fourth through sixth write operations), the values of each of signals $W_0$, $W_1$, and $W_2$ can either remain unchanged (at the current value) or change (from a current value to a different value), depending on whether a corresponding FIFO cell stores information in a particular subsequent write operation.

As described above with reference to FIG. 2 through FIG. 6, write control circuit 242 (FIG. 3) can use signals $W_0$, $W_1$, and $W_2$ generate signals (e.g., write pointer information) $WR\_PTR_0$, $WR\_PTR_1$, and $WR\_PTR_2$. Signals $W_0$, $W_1$, and $W_2$ can also be used to generate signals $FULL_0$, $FULL_1$, and $FULL_2$, respectively. Further, signals $W_0$, $W_1$, and $W_2$ can also be provided to read clock domain 222 (FIG. 2 through FIG. 6) to control the values of signals $EMPTY_0$, $EMPTY_1$, and $EMPTY_2$, respectively.

A circular read operation shown in FIG. 7 is similar to the write circular operation described above. In a circular read operation, FIFO cells 210, 211, and 212 can be selected (after reset) to store different information in a sequential order, starting at a first FIFO cell (e.g., FIFO cell 210) and then returning to the first FIFO cell (e.g., FIFO cell 210) after the last FIFO cell (e.g., FIFO cell 212) is selected. For example, as shown in FIG. 7, six read operations (e.g., six read cycles) are performed after the reset, starting from the first read operation (first read) through the sixth read operation (sixth read). FIFO cells 210, 211, and 212 are sequentially selected to be read in the first, second, and third read operations, respectively. After the third read operation, FIFO cells 210, 211, and 212 are sequentially selected to be read again in the fourth, fifth, and sixth read operations, respectively. After the sixth read operation, the selection process can repeat for subsequent read operations. As described above with reference to FIG. 2 through FIG. 6, read control circuit 243 (FIG. 3) can generate signals (e.g., read pointer information) $RR\_PTR_0$, $RR\_PTR_1$, and $RR\_PTR_2$ based on signals $R_0$, $R_1$, and $R_2$ to control the selection of a particular FIFO cell FIFO cells 210, 211, and 212 in during a read operation.

In FIG. 7, the value of a particular signal among signals $R_0$, $R_1$, and $R_2$ can change (toggle) when (e.g., each time) information is read from a corresponding FIFO cell in a read operation. The value of a particular signal among signals $R_0$, $R_1$, and $R_2$ can remain unchanged if information is not read from a corresponding FIFO cell in a read operation.

For example, as shown in FIG. 7, in the first read operation, signal $R_0$ changes from 0 to 1 when information is read from FIFO cell 210 in the first read operation. In the first read operation, each of signals $R_1$ and $R_2$ remains unchanged at 0 because FIFO cells 211 and 212 are not selected to be read the first read operation.

In the second read operation, signal $R_0$ remains unchanged at 1 because FIFO cell 210 is not selected to be read in the second read operation. In the second read operation, signal $R_1$ changes from 0 to 1 when information is read from FIFO cell 211 in the second read operation. In the second read operation, signal $R_2$ remains unchanged at 0 because FIFO cell 212 is not select to be read in the second read operation.

In the third read operation, each of signals $R_0$ and $R_1$ remains unchanged at 1 because FIFO cells 210 and 211 are not selected to be read in the third read operation. In the third read operation, signal $R_2$ changes from 0 to 1 when information is read from FIFO cell 212 in the third read operation.

In each of subsequent read operations (e.g., the fourth through sixth read operations) the values of each of signals $R_0$, $R_1$, and $R_2$ can either remain unchanged (at the current value) or change (from a current value to a different value), depending on whether a corresponding FIFO cell is read in a particular subsequent write operation As described above with reference to FIG. 2 through FIG. 6, read control circuit 243 (FIG. 3) can use signals $R_0$, $R_1$, and $R_2$ generate signals (e.g., read pointer information) $R\_PTR_0$, $R\_PTR_1$, and $R\_PTR_2$. Signals $R_0$, $R_1$, and $R_2$ can also be used to generate signals $EMPTY_0$, $EMPTY_1$, and $EMPTY_2$, respectively. Further, signals $R_0$, $R_1$, and $R_2$ can also be provided to write clock domain 222 (FIG. 2 through FIG. 6) to control the values of signals $FULL_0$, $FULL_1$, and $FULL_2$, respectively.

Figure 8:
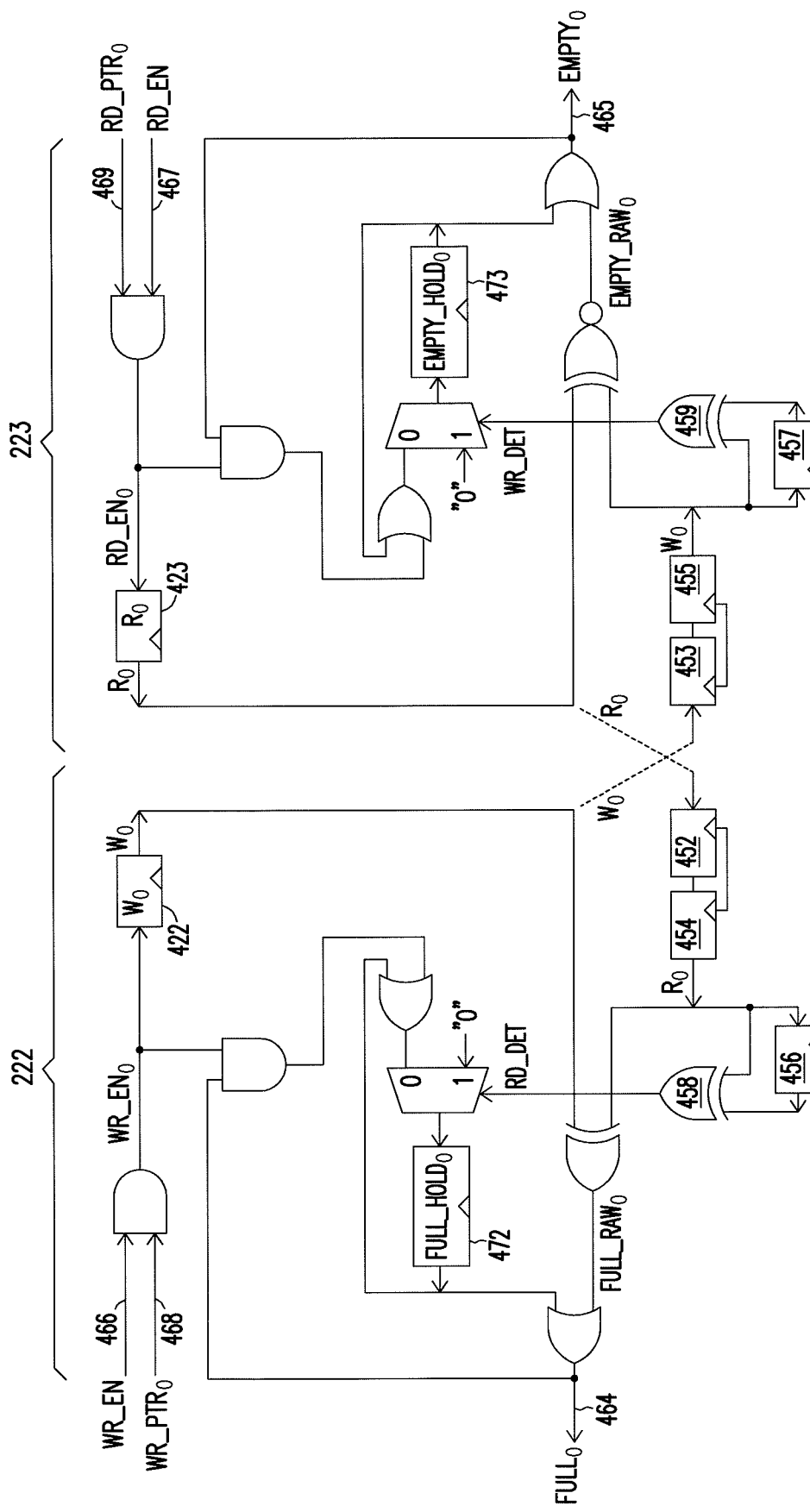
FIG. 8, FIG. 9, and FIG. 10 show schematic diagrams of respective FIFO cells of a random access memory (RAM) based FIFO unit, according to some embodiments described herein.
Figure 9:
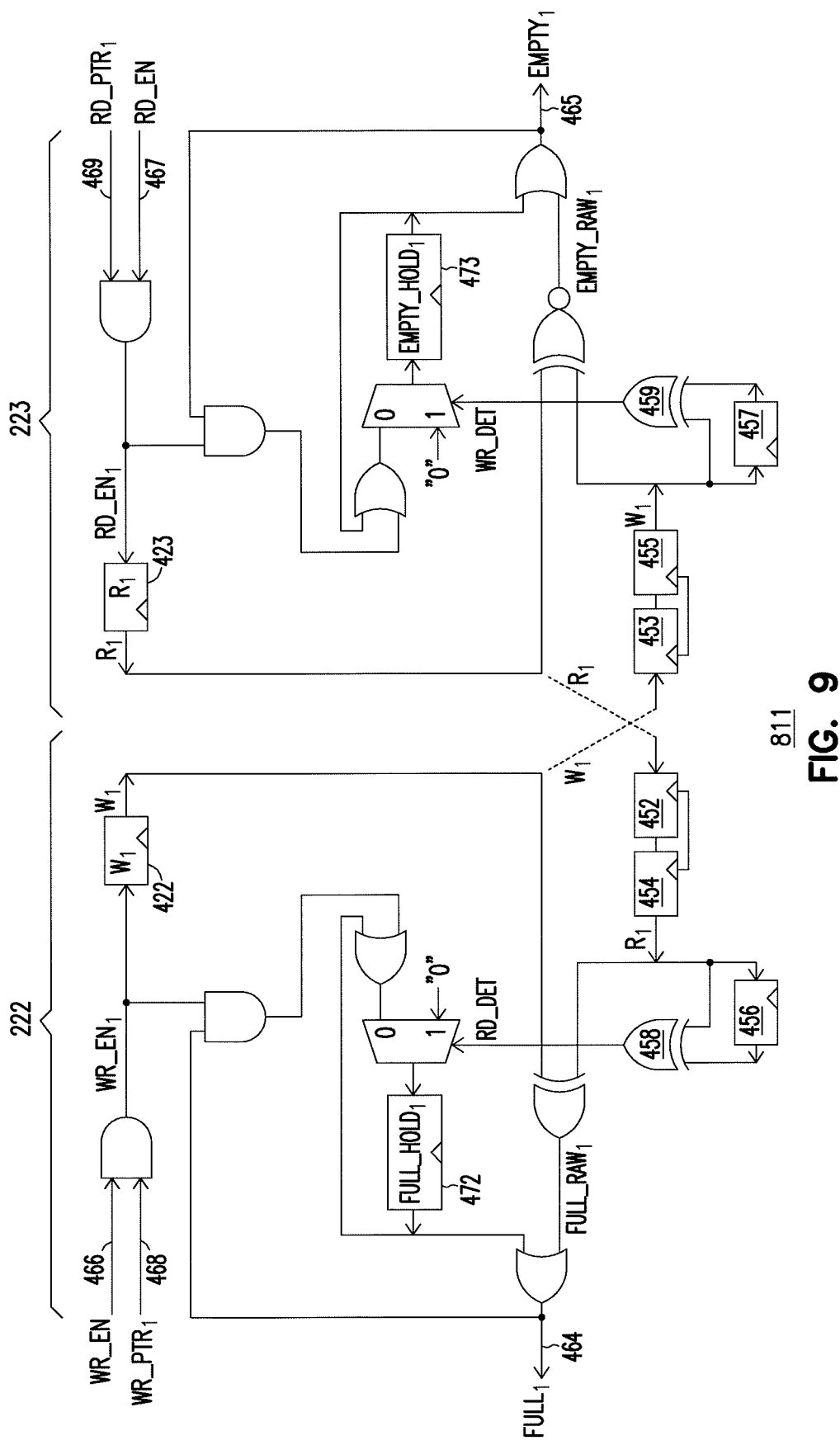
Figure 10:
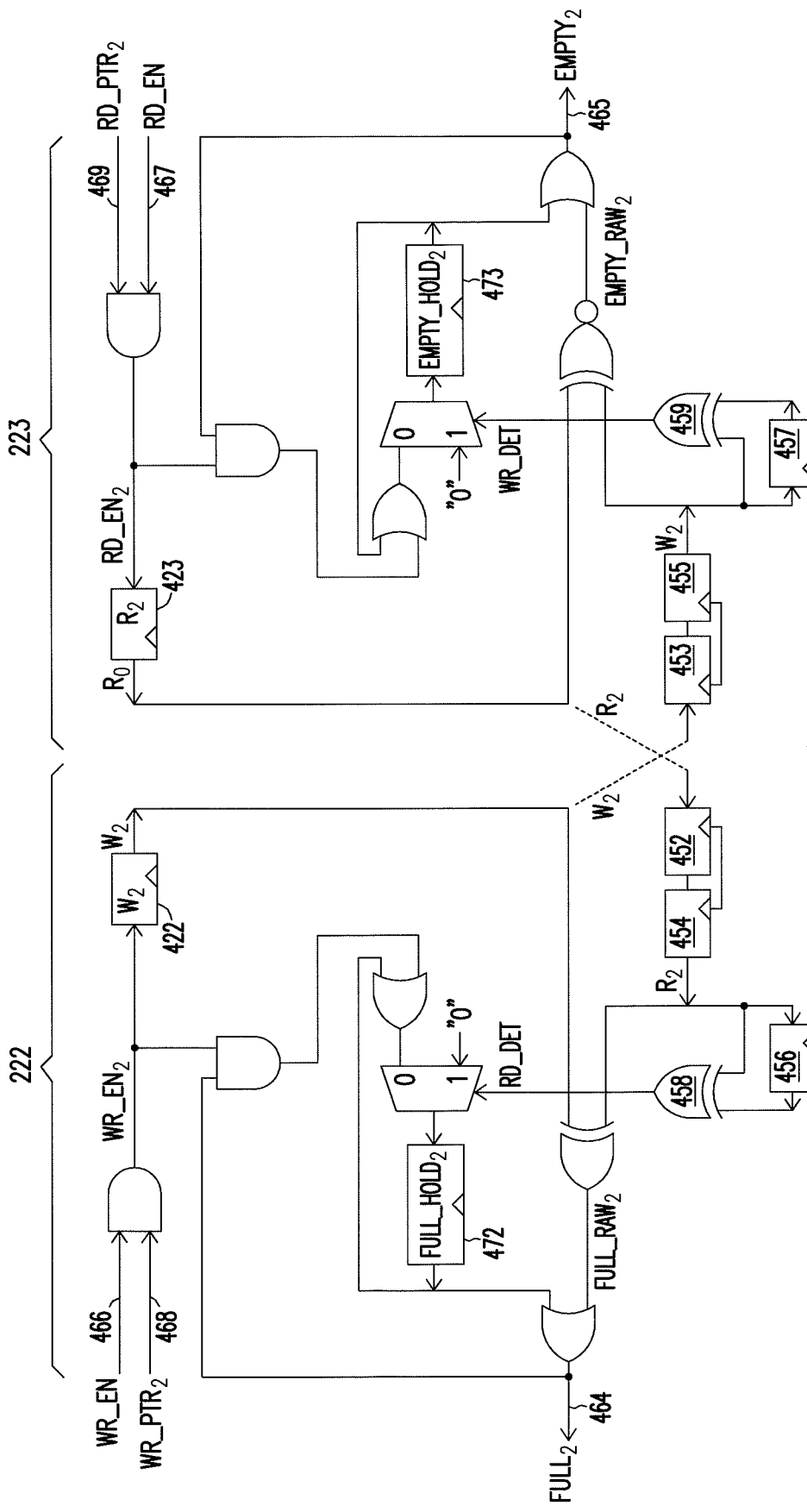

FIG. 8, FIG. 9, and FIG. 10 show schematic diagrams of FIFO cells 810, 811, and 812, respectively, of RAM-based FIFO unit 1103 (FIG. 11), according to some embodiments described herein. As shown in FIG. 8, FIG. 9, and FIG. 10, FIFO cells 810, 811, and 812 can have elements similar or identical to the elements of FIFO cell 210 (FIG. 4), FIFO cell 211 (FIG. 5), and FIFO cell 212 (FIG. 6), respectively. Thus, for simplicity, descriptions of similar or identical elements are not repeated. Differences between FIFO cells 210, 211, and 212 and FIFO cells 810, 811, and 812 include the omission of memory location 410, selector 413, nodes 462 (that provide DATA_WR), and outputs $463_0$, $463_1$, and $463_2$ from FIFO cells 810, 811, and 812. As described below, FIFO cells 810, 811, and 812 can be included in a FIFO unit (e.g., FIFO unit 1103 of FIG. 11) that may use a RAM-based memory storage to store information. The RAM-based memory storage can be formed outside (e.g., formed separately from) FIFO cells 810, 811, and 812.

Figure 11:
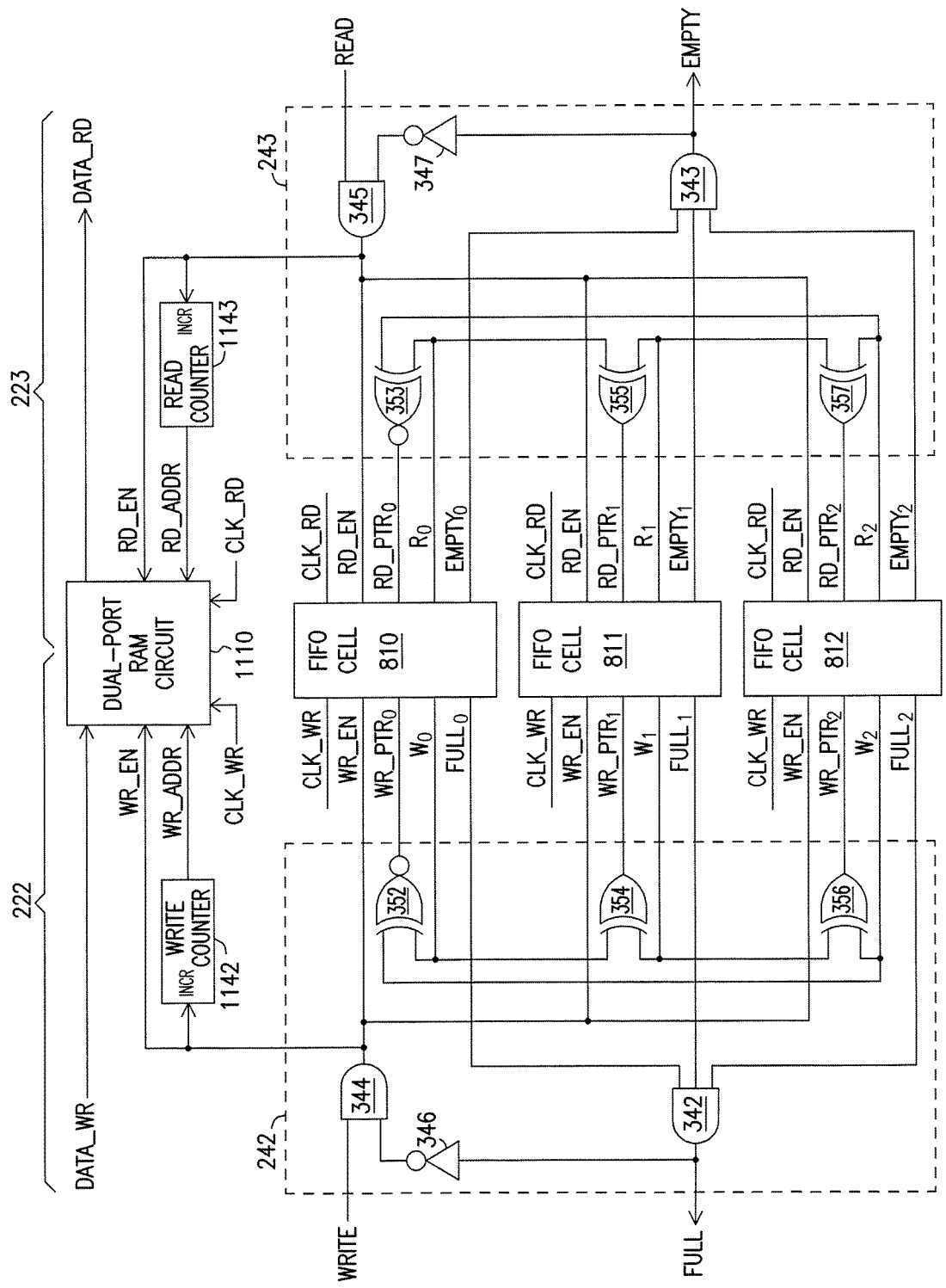
FIG. 11 shows a schematic diagram of a RAM-based FIFO unit including the FIFO cells of FIG. 8, FIG. 9, and FIG. 10, according to some embodiments described herein.

FIG. 11 shows a schematic diagram of a FIFO unit 1103 including FIFO cells 810, 811, and 812 of FIG. 8, FIG. 9, and FIG. 10, respectively, according to some embodiments described herein. As shown in FIG. 11, FIFO unit 1103 can include a dual-port (e.g., write and read port) RAM circuit (e.g., an array of RAM cells) 1110 to store information (e.g., input information DATA_WR) and to provide information (e.g., output data DATA_RD).

Information DATA_WR can be provided to FIFO unit 1103 by a component associated with write clock domain 222 (e.g., component 102 of FIG. 1) that provides signal WRITE to FIFO unit 1103. Dual-port RAM circuit 1110 can use timing of clock signal CLK_WR capture information DATA_WR. Information DATA_RD can be provided to a component associated with write clock domain 222 (e.g., component 102 of FIG. 1) that provides signals READ to FIFO unit 1103. Dual-port RAM circuit 1110 can use timing of clock signal CLK_RD to read information stored in dual-port RAM circuit 1110.

As shown in FIG. 11, FIFO unit 1103 can include a write counter 1142 that can generate address (e.g., write address) information WR_ADDR based on signal WR_EN. Write counter 1142 can include an increment-by-1 binary counter that can be incremented (e.g., in response to signal WR_EN at a node "INCR") when (e.g., each time) a write operation is performed in FIFO unit 1103. The values of write counter 1142 can be used to provide the values for address information WR_ADDR. Each value of address information WR_ADDR can be assigned to (e.g., pointed to) a unique physical memory location (e.g., memory cells) in dual-port RAM circuit 1110. The count value of write counter 1142 can roll over to an initial count value (e.g., value 0) after the count value reaches a maximum count value. The maximum value can be determined based on (e.g., equal to) the depth (e.g., N) of FIFO cells of FIFO unit 1103. The depth can be equal to the number of FIFO cells of FIFO unit 1103. For example, if FIFO unit 1103 includes three (N=3) FIFO cells 810, 811, and 812 (as show in FIG. 11), and if the initial count is zero, then the value of write counter 1142 can roll over after count value is 2 (e.g., 0, 1, 2, 0, 1, 2, 0, and so on).

As shown in FIG. 11, FIFO unit 1103 can include a read counter 1143 that can generate address (e.g., read address) information RD_ADDR based on signal RD_EN. Read counter 1143 can include an increment-by-1 binary counter that can be incremented (e.g., in response to signal RD_EN at a node "INCR") when (e.g., each time) a read operation is performed in FIFO unit 1103. The values of read counter 1143 can be used to provide the values for address information RD_ADDR. Each value of address information RD_ADDR can be assigned to (e.g., pointed to) a unique memory location (e.g., physical location of memory location (or elements)) in dual-port RAM circuit 1110. The count value of read counter 1143 can roll over to an initial count value (e.g., value 0) after the count value reaches a maximum count value. The maximum value can be determined based on (e.g., equal to) the depth (e.g., N) of FIFO cells of FIFO unit 1103. The depth can be equal to the number of FIFO cells of FIFO unit 1103. For example, if FIFO unit 1103 includes three (N=3) FIFO cells 810, 811, and 812 (as shown in FIG. 11), and if the initial count is zero, then the value of read counter 1143 can roll over after count value is 2 (e.g., 0, 1, 2, 0, 1, 2, 0, and so on).

Figure 12:
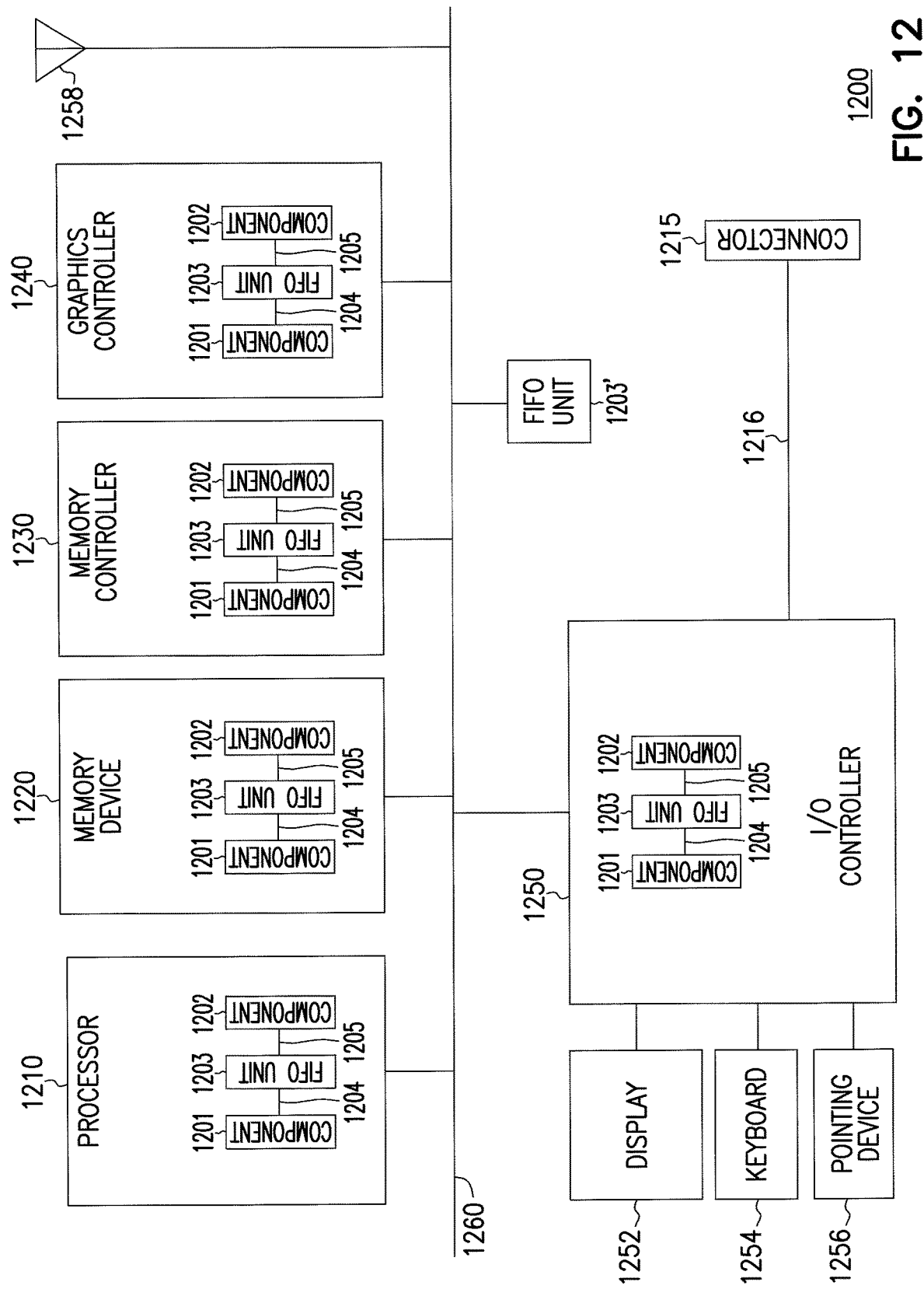
FIG. 12 shows an apparatus in the form of a system (e.g., electronic system), according to some embodiments described herein.

FIG. 12 shows an apparatus in the form of a system (e.g., electronic system) 1200, according to some embodiments described herein. System 1200 can include or be included in a computer, a tablet, or other electronic systems. As shown in FIG. 12, system 1200 can include a processor 1210, a memory device 1220, a memory controller 1230, a graphics controller 1240, an input/output (I/O) controller 1250, a display 1252, a keyboard 1254, a pointing device 1256, at least one antenna 1258, a connector 1215, and a bus 1260 (e.g., conductive lines formed on a circuit board (not shown) of system 1200).

Each of processor 1210, memory device 1220, memory controller 1230, graphics controller 1240, and I/O controller 1250 can include an IC chip (e.g., component 101 or 102 of FIG. 1).

In some arrangements, system 1200 does not have to include a display. Thus, display 1252 can be omitted from system 1200. In some arrangements, system 1200 does not have to include any antenna. Thus, antenna 1258 can be omitted from system 1200.

Processor 1210 can include a general-purpose processor or an application specific integrated circuit (ASIC). Processor 1210 can include a central processing unit (CPU).

Memory device 1220 can include a dynamic random access memory (DRAM) device, a static random access memory (SRAM) device, a flash memory device, phase change memory, a combination of these memory devices, or other types of memory. FIG. 12 shows an example where memory device 1220 is a stand-alone memory device separated from processor 1210. In an alternative arrangement, memory device 1220 and processor 1210 can be located on the same die. In such an alternative arrangement, memory device 1220 is an embedded memory in processor 1210, such as embedded DRAM (eDRAM), embedded SRAM (eSRAM), embedded flash memory, or another type of embedded memory.

Display 1252 can include a liquid crystal display (LCD), a touchscreen (e.g., capacitive or resistive touchscreen), or another type of display. Pointing device 1256 can include a mouse, a stylus, or another type of pointing device.

I/O controller 1250 can include a communication module for wired or wireless communication (e.g., communication through one or more antennas 1258). Such wireless communication may include communication in accordance with WiFi communication technique, Long Term Evolution Advanced (LTE-A) communication technique, or other communication techniques.

I/O controller 1250 can also include a module to allow system 1200 to communicate with other devices or systems in accordance with to one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), Ethernet, and other specifications.

Connector 1215 can be arranged (e.g., can include terminals, such as pins) to allow system 1200 to be coupled to an external device (or system). This may allow system 1200 to communicate (e.g., exchange information) with such a device (or system) through connector 1215. Connector 1215 may be coupled to I/O controller 1250 through a connection 1216 (e.g., a bus).

Connector 1215, connection 1216, and at least a portion of bus 1260 can include elements (e.g., conductive terminals, conductive lines, or other conductive elements) that conform with at least one of USB, DP, HDMI, Thunderbolt, PCIe, Ethernet, and other specifications.

FIG. 12 shows the elements (e.g., devices and controllers) of system 1200 arranged separately from each other as an example. For example, each of processor 1210, memory device 1220, memory controller 1230, graphics controller 1240, and I/O controller 1250 can be located on a separate IC chip (e.g., separate semiconductor dies). In some arrangements, two or more elements (e.g., processor 1210, memory device 1220, graphics controller 1240, and I/O controller 1250) of system 1200 can be located on the same die (e.g., same IC chip) that can form a system-on-chip (SoC).

As shown in FIG. 12, each of processor 1210, memory device 1220, memory controller 1230, graphics controller 1240, and I/O controller 1250 can include components 1201 and 1202 coupled to a FIFO unit 1203 through conductive paths 1204 and 1205. Components 1201 and 1202, FIFO unit 1203, and conductive paths 1204 and 1205 can include any components (e.g., components 101 and 102 of FIG. 1), FIFO units and their FIFO cells (e.g., FIFO units 203 of FIG. 2 and FIG. 3 and FIFO unit 1103 of FIG. 11), and conductive paths (e.g., conductive paths 104 and 105 of FIG. 1), respectively, described above with reference to FIG. 1 through FIG. 11.

As show in FIG. 12, system 1200 can also include a FIFO unit 1203', which can include any of the FIFO units and their FIFO cells (e.g., FIFO units 203 of FIG. 2 and FIG. 3 and FIFO unit 1103 of FIG. 11) described above with reference to FIG. 1 through FIG. 11. As shown in FIG. 12, FIFO unit 1203' can be located separately from other devices. For example, FIFO unit 1203 can be included in an IC chip that is different from (e.g., located outside) the IC chip that includes processor 1210, memory device 1220, memory controller 1230, graphics controller 1240, or I/O controller 1250. Two or more of the elements (e.g., two or more of processor 1210, memory device 1220, memory controller 1230, graphics controller 1240, and I/O controller 1250) of system 1200 can store information in and read information from (e.g., through bus 1260) FIFO unit 1203'.

Figure 13:
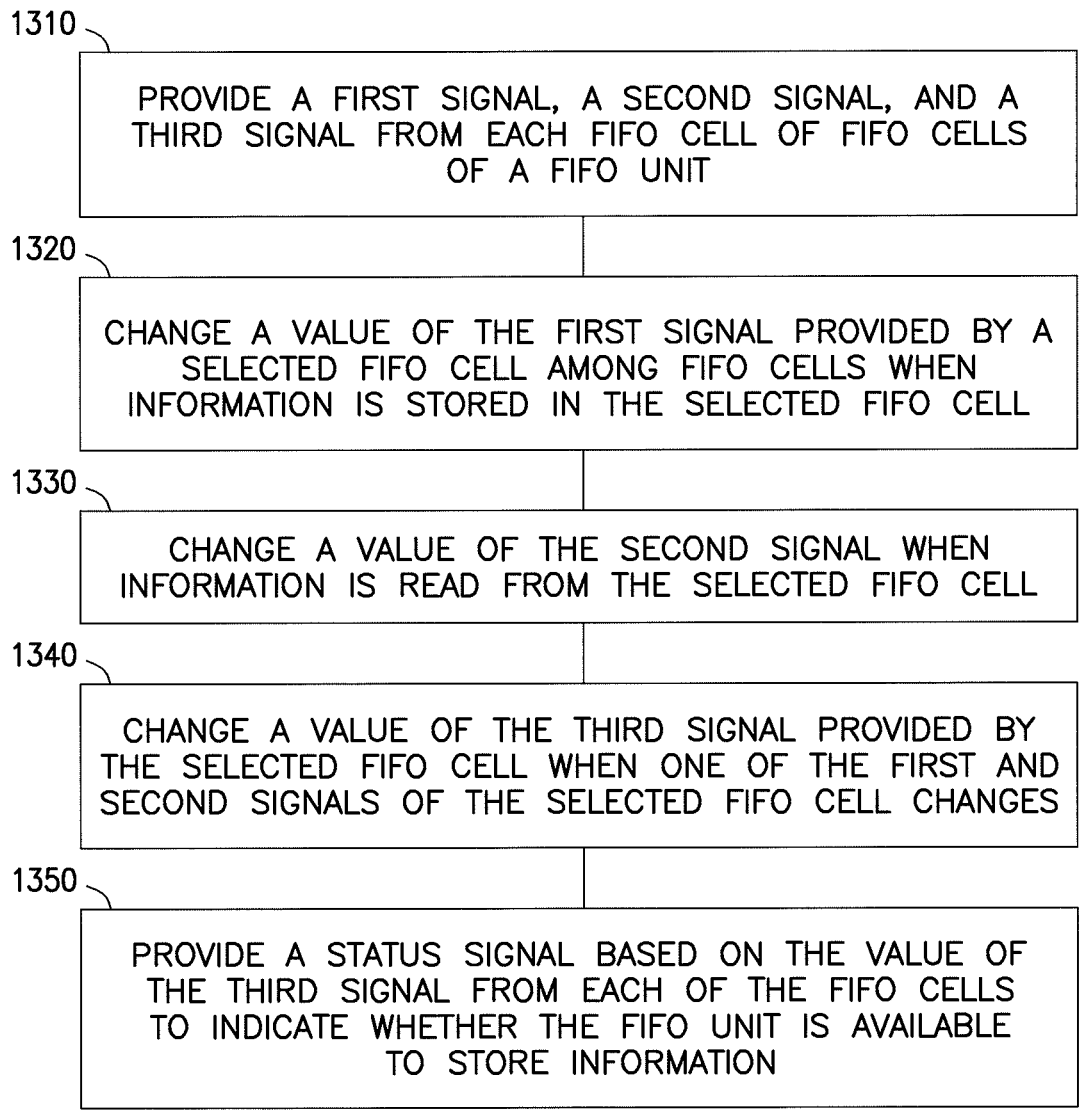
FIG. 13 is a flowchart showing a method of operating an apparatus, according to some embodiments described herein.

FIG. 13 is a flowchart showing a method 1300 of operating an apparatus, according to some embodiments described herein. The apparatus used in method 1300 can include any of the apparatuses (e.g., apparatus 100 and system 1200 including FIFO units 203, 1103, 1203, and 1203') described above with reference to FIG. 1 through FIG. 12. Some of the activities in method 1300 may be performed by hardware, software, firmware, or any combination of hardware, software, and firmware. For example, some of the activities in method 1300 may be performed by hardware, software, firmware, or any combination of hardware, software, and firmware implemented in any of the apparatus (e.g., apparatus 100 and system 1200 including FIFO units 203, 1103, 1203, and 1203') described above with reference to FIG. 1 through FIG. 12.

As shown in FIG. 13, activity 1310 of method 1300 can include providing a first signal, a second signal, and a third signal from each FIFO cell of FIFO cells of a FIFO unit. Activity 1320 can include changing a value of the first signal provided by a selected FIFO cell among FIFO cells when information is stored in the selected FIFO cell. Activity 1330 can include changing a value of the second signal when information is read from the selected FIFO cell. Activity 1340 can include changing a value of the third signal provided by the selected FIFO cell when the value of one of the first and second signals of the selected FIFO cell changes. The third signal of the selected FIFO cell can indicate whether the selected FIFO cell is available to store information. Activity 1350 can include providing a status signal based on the value of the third signal from each of the FIFO cells to indicate whether the FIFO unit is available to store information.

The illustrations of the apparatuses (e.g., apparatus 100 and system 1200 including FIFO units 203, 1103, 1203, and 1203') described above with reference to FIG. 1 through FIG. 12 are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor modules or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, a list of items joined by the term "at least one of" can mean any combination of the listed items. For example, if items A and B are listed, then the phrase "at least one of A and B" can mean A only; B only; or A and B. In another example, if items A, B, and C are listed, then the phrase "at least one of A, B and C" can mean A only; B only; C only; A and B (without C); A and C (without B); B and C (without A); or all of A, B, and C. Item A can include a single element or multiple elements. Item B can include a single element or multiple elements. Item C can include a single element or a multiple elements.

ADDITIONAL NOTES AND EXAMPLES

Example 1 includes subject matter (such as a device, an electronic apparatus (e.g., circuit, electronic system, or both), or a machine) including first-in first-out (FIFO) cells included in an asynchronous FIFO unit, a first circuit included in the asynchronous FIFO unit to provide first information based on a value of a first bit from each of the FIFO cells in order to select one of the FIFO cells to be a selected FIFO cell for storing data information in the selected FIFO cell, and a second circuit included in the asynchronous FIFO unit to provide information based on a value of a second bit from each of the FIFO cells in order to select one of the FIFO cells to be a selected FIFO cell for reading data information from the selected FIFO cell.

In Example 2, the subject matter of Example 1 may optionally include, wherein the first circuit is to provide third information based on values of the first and second bits from each of the FIFO cells in order to indicate whether the asynchronous FIFO unit is available to store data information.

In Example 3, the subject matter of Example 2 may optionally include, wherein the second circuit is to provide fourth information based on the values of the first and second bits from each of the FIFO cells in order to indicate whether the asynchronous FIFO unit is available to be read.

In Example 4, the subject matter of Example 1 may optionally include, wherein each of the FIFO cells includes an output, and the second circuit is to perform a logic operation on information from the output of each of the FIFO cells to provide a value for data information read from the selected FIFO cell.

In Example 5, the subject matter of Example 1 may optionally include, wherein the asynchronous FIFO unit is to provide FIFO empty level information based on whether the first FIFO cell is available to store data information and based on whether the second FIFO cell is available to store data information.

In Example 6, the subject matter of Example 1 or 5 may optionally include, wherein the asynchronous FIFO unit is to provide FIFO fill information based on whether the first FIFO cell is available to be read and based on whether the second FIFO cell is available to be read.

In Example 7, the subject matter of any of Examples 1-6 may optionally include, wherein a total number of the FIFO cells is an odd number.

In Example 8, the subject matter of any of Examples 1-6 may optionally include, wherein a total number of the FIFO cells is an even number.

Example 9 includes subject matter (such as a device, an electronic apparatus (e.g., circuit, electronic system, or both), or a machine) including a first first-in first-out (FIFO) cell included in a FIFO unit to provide a first signal and a second signal, the first FIFO cell to change a value of the first signal when data information is stored in the first FIFO cell, to change a value of the second signal when data information is read from the first FIFO cell, and to provide a third signal based on the values of the first and second signals to indicate whether the first FIFO cell is available to store data information, and a second FIFO cell included in the FIFO unit to provide a fourth signal and a fifth signal, the second FIFO to change a value of the fourth signal when data information is stored in the second FIFO, to change a value of the fifth signal when data information is read from the second FIFO cell, and to provide a sixth signal based on the values of the fourth and fifth signals to indicate whether the second FIFO cell is available to store data information, and a circuit included in the FIFO unit to provide a seventh signal based on the third and sixth signals to indicate whether the FIFO unit is available to store data information.

In Example 10, the subject matter of Example 9 may optionally include, wherein the first FIFO cell is to provide an eighth signal based on the values of the first and second signals to indicate whether the first FIFO cell is available to be read, the second FIFO cell is to provide a ninth signal based on the values of the fourth and fifth signals to indicate whether the second FIFO cell is available to be read, and an additional circuit included in the FIFO unit to provide a tenth signal based on the eighth and ninth signals to indicate whether the FIFO unit is available to be read.

In Example 11, the subject matter of Example 10 may optionally include, wherein the first circuit is to provide an eleventh signal based on the values of the first and fourth signals to indicate whether the first FIFO cell is selected to store information, and the second circuit is to provide a twelfth signal based on the values of the second and fifth signals to indicate whether the first FIFO cell is selected to be read.

In Example 12, the subject matter of Example 9 may optionally include, wherein the first FIFO cell includes a register to store a value if new data information is stored in the first FIFO cell while the third signal has a value indicating that the first FIFO cell is unavailable to store data information, the value stored in the register and the value of the third signal being a same value, and the second FIFO cell includes a register to store a value if new data information is stored in the second FIFO cell while the sixth signal has a value indicating that the second FIFO cell is unavailable to store data information, the value stored in the register of the second FIFO cell and the value of the sixth signal being a same value.

In Example 13, the subject matter of Example 10 may optionally include, wherein the first FIFO cell includes a register to store a value if data information is read from the first FIFO cell while the eighth signal has a value indicating that the first FIFO cell is unavailable to be read, the value stored in the register and the value of the eighth signal being a same value, and the second FIFO cell includes a register to store a value if data information is read from the second FIFO cell while the ninth signal has a value indicating that the second FIFO cell is unavailable to be read, the value stored in the register of the second FIFO and the value of the eighth signal being a same value.

In Example 14, the subject matter of Example 9 may optionally include, wherein the first FIFO unit is available to store information when the first and second signals have a same value, and the first FIFO unit is unavailable to store information when the first and second signals have different values, and the second FIFO unit is available to store information when the fourth and fifth signals have a same value, and the second FIFO unit is unavailable to store information when the fourth and fifth signals have different values.

In Example 15, the subject matter of Example 10 may optionally include, wherein the first FIFO unit is available to be read when the first and second signals have different values, and the first FIFO unit is unavailable to be read when the first and second signals have a same value, and the second FIFO unit is available to be read when the fourth and fifth signals have different value, and the second FIFO unit is unavailable to be read when the fourth and fifth signals have a same value.

In Example 16, the subject matter of Example 9 may optionally include, wherein the first FIFO cell is to change the value of the first signal from a first value to a second value when information is stored in the first FIFO cell in a first write operation, and change the value of the first signal from the second value to the first value when information is stored in the first FIFO cell in a second write operation.

In Example 17, the subject matter of Example 16 may optionally include, wherein the first value is binary one and the second value is binary zero.

In Example 18, the subject matter of Example 9 may optionally include, wherein the first FIFO cell is to change the value of the second signal from a first value to a second value when information is read from the first FIFO cell in a first read operation, and change the value of the second signal from the second value to the first value when information is read from the first FIFO cell in a second read operation.

In Example 19, the subject matter of Example 18 may optionally include, wherein the first value is binary one and the second value is binary zero.

Example 20 includes subject matter such as a device, an electronic apparatus (e.g., circuit, electronic system, or both), or a machine) including first-in first-out (FIFO) cells included in FIFO unit, each of the FIFO cells to provide a first signal, a second signal, and a third signal, a selected FIFO cell of the FIFO cells to change a value of the first signal provided by the selected FIFO cell when information is stored in a memory location, to change a value of the second signal provided by the selected FIFO cell when information is read from the memory location, and to change a value of each of the third and a fourth signal provided by the selected FIFO cell when one of the first and second signals of the selected FIFO cell changes, a first circuit included in the FIFO unit to provide a first status signal based on the value of the third signal from each of the FIFO cells to indicate whether the FIFO unit is available to store information, and a second circuit included in the FIFO unit to provide a second status signal based on the value of the fourth signal from each of the FIFO cells to indicate whether the FIFO unit is available to be read.

In Example 21, the subject matter of Example 20 may optionally include, wherein the selected FIFO cell is to change the value of the each of the first and second signals between a first value and a second value, the first value corresponds to binary zero, and the second value corresponds to a binary one.

In Example 22, the subject matter of Example 20 or 21 may optionally include, wherein the memory location is included in a dual-port random access memory (RAM) circuit.

Example 23 includes subject matter such as a device, an electronic apparatus (e.g., circuit, electronic system, or both), or a machine) including conductive lines on a circuit board, an antenna coupled to the conductive paths, a device coupled to the conductive path, the device including an asynchronous first-in first-out (FIFO) unit, the FIFO unit including FIFO cells, a first circuit to provide first information based on a value of a first bit from each of the FIFO cells in order to select one of the FIFO cells to be a selected FIFO cell for storing data information in the selected FIFO cell, and a second circuit to provide information based on a value of a second bit from each of the FIFO cells in order to select one of the FIFO cells to be a selected FIFO cell for reading data information from the selected FIFO cell.

In Example 24, the subject matter of Example 23 may optionally include, wherein the device includes a processor.

In Example 25, the subject matter of Example 23 or 24 may optionally include, wherein further comprising a connector coupled to at least one of the conductive lines and the device, the conductor conforming with at least one of Universal Serial Bus (USB), DisplayPort (DP), High-Definition Multimedia Interface (HDMI), Thunderbolt, Ethernet, and Peripheral Component Interconnect Express (PCIe) specifications.

Example 26 includes subject matter (such as a method of operating a device, an electronic apparatus (e.g., circuit, electronic system, or both), or a machine) including providing a first signal, a second signal, and a third signal from each first-in first-out (FIFO) cell of FIFO cells of a FIFO unit, changing a value of the first signal provided by a selected FIFO cell among FIFO cells when information is stored in the selected FIFO cell, changing a value of the second signal when information is read from the selected FIFO cell, changing a value of the third signal provided by the selected FIFO cell when the value of one of the first and second signals of the selected FIFO cell changes, the third signal of the selected FIFO cell indicating whether the selected FIFO cell is available to store information, and providing a status signal based on the value of the third signal from each of the FIFO cells to indicate whether the FIFO unit is available to store information.

In Example 27, the subject matter of Example 26 may optionally include, wherein changing the value of the each of the first and second signals includes changing the value between a first value and a second value, the first value corresponds to binary zero, and the second value corresponds to a binary one.

In Example 28, the subject matter of Example 26 or 27 may optionally include, wherein the selected FIFO unit is available to store information when the first and second signals have a same value, and the selected FIFO unit is unavailable to store information when the first and second signals have different values.

In Example 29, the subject matter of Example 28 may optionally include, wherein the FIFO unit is available to store information when at least one of the FIFO cells is available to store information, and the FIFO unit is unavailable to store information when none of the FIFO cells is available to store information.

In Example 30, the subject matter of Example 26 may optionally include, wherein providing a fourth signal from each FIFO cell of FIFO cells of a FIFO unit, changing a value of the fourth signal from the selected FIFO cell when one of the first and second signals of the selected FIFO cell changes, the fourth signal indicating whether the selected FIFO cell is available to be read, and providing an additional status signal based on the value of the fourth signal from each of the FIFO cells to indicate whether the FIFO unit is available to be read.

In Example 31, the subject matter of Example 30 may optionally include, wherein the FIFO unit is available to be read when at least one of the FIFO cells is available to be read, and the FIFO unit is unavailable to be read when none of the FIFO cells is available to be read.

In Example 32, the subject matter of Example 25 may optionally include, wherein the selected FIFO unit is available to be read when the first and second signals have different values, and the selected FIFO unit is unavailable to be read when the first and second signals have same value.

In Example 33, the subject matter of Example 26 may optionally include, further comprising providing a fourth signal to each of the FIFO cells, the fourth signal at a particular FIFO cell among the FIFO cells indicating whether the particular FIFO cell is the selected FIFO cell to store information, the fourth signal at the particular FIFO cell having a value based on the value of the first signal at the particular FIFO cell and the value of the first signal from another FIFO cell among the FIFO cells.

In Example 34, the subject matter of Example 33 may optionally include, further comprising providing a fifth signal to each of the FIFO cells, the fifth signal at a particular FIFO cell among the FIFO cells indicating whether the particular FIFO cell is the selected FIFO cell to be read, the fifth signal at the particular FIFO cell having a value based on the value of the second signal at the particular FIFO cell and the value of the second signal from another FIFO cell among the FIFO cells.

Example 35 includes subject matter (such as a device, an electronic apparatus (e.g., circuit, electronic system, or both), or machine) including means for performing any of the subject matter of Examples 26-34.

The subject matter of Example 1 through Example 35 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    a first first-in first-out (FIFO) cell included in a FIFO unit to provide a first signal and a second signal; the first FIFO cell to change a value of the first signal when data information is stored in the first FIFO cell, to change a value of the second signal when data information is read from the first FIFO cell, and to provide a third signal based on the values of the first and second signals to indicate whether the first FIFO cell is available to store data information;

a second FIFO cell included in the FIFO unit to provide a fourth signal and a fifth signal, the second FIFO to change a value of the fourth signal when data information is stored in the second FIFO, to change a value of the fifth signal when data information is read from the second FIFO cell, and to provide a sixth signal based on the values of the fourth and fifth signals to indicate whether the second FIFO cell is available to store data information; and a circuit included in the FIFO unit to provide a seventh signal based on the third and sixth signals to indicate whether the FIFO unit is available to store data information.

2. The apparatus of claim 1, wherein:

the first FIFO cell is to provide an eighth signal based on the values of the first and second signals to indicate whether the first FIFO cell is available to be read;

the second FIFO cell is to provide a ninth signal based on the values of the fourth and fifth signals to indicate whether the second FIFO cell is available to be read; and an additional circuit included in the FIFO unit to provide a tenth signal based on the eighth and ninth signals to indicate whether the FIFO unit is available to be read.

3. The apparatus of claim 2, wherein:

the first circuit is to provide an eleventh signal based on the values of the first and fourth signals to indicate whether the first FIFO cell is selected to store information; and the second circuit is to provide a twelfth signal based on the values of the second and fifth signals to indicate whether the first FIFO cell is selected to be read.

4. The apparatus of claim 1, wherein:

the first FIFO cell includes a register to store a value if new data information is stored in the first FIFO cell while the third signal has a value indicating that the first FIFO cell is unavailable to store data information; the value stored in the register and the value of the third signal being a same value; and the second FIFO cell includes a register to store a value if new data information is stored in the second FIFO cell while the sixth signal has a value indicating that the second FIFO cell is unavailable to store data information, the value stored in the register of the second FIFO cell and the value of the sixth signal being a same value.

5. The apparatus of claim 2, wherein:

the first FIFO cell includes a register to store a value if data information is read from the first FIFO cell while the eighth signal has a value indicating that the first FIFO cell is unavailable to be read, the value stored in the register and the value of the eighth signal being a same value; and the second FIFO cell includes a register to store a value if data information is read from the second FIFO cell while the ninth signal has a value indicating that the second FIFO cell is unavailable to be read, the value stored in the register of the second FIFO and the value of the eighth signal being a same value.

6. The apparatus of claim 1, wherein:

the first FIFO unit is available to store information when the first and second signals have a same value, and the first FIFO unit is unavailable to store information when the first and second signals have different values; and the second FIFO unit is available to store information when the fourth and fifth signals have a same value, and the second FIFO unit is unavailable to store information when the fourth and fifth signals have different values.

7. The apparatus of claim 2, wherein:

the first FIFO unit is available to be read when the first and second signals have different values, and the first FIFO unit is unavailable to be read when the first and second signals have a same value; and the second FIFO unit is available to be read when the fourth and fifth signals have different value, and the second FIFO unit is unavailable to be read when the fourth and fifth signals have a same value.

8. The apparatus of claim 1, wherein the first FIFO cell is to:

change the value of the first signal from a first value to a second value when information is stored in the first FIFO cell in a first write operation; and change the value of the first signal from the second value to the first value when information is stored in the first FIFO cell in a second write operation.

9. The apparatus of claim 8, wherein the first value is binary one and the second value is binary zero.

10. The apparatus of claim 1, wherein the first FIFO cell is to:

change the value of the second signal from a first value to a second value when information is read from the first FIFO cell in a first read operation; and change the value of the second signal from the second value to the first value when information is read from the first FIFO cell in a second read operation.

11. The apparatus of claim 10, wherein the first value is binary one and the second value is binary zero.

12. An apparatus comprising:

first-in first-out (FIFO) cells included in FIFO unit, each of the FIFO cells to provide a first signal, a second signal, and a third signal;

a selected FIFO cell of the FIFO cells to change a value of the first signal provided by the selected FIFO cell when information is stored in a memory location, to change a value of the second signal provided by the selected FIFO cell when information is read from the memory location, and to change a value of each of the third and a fourth signal provided by the selected FIFO cell when one of the first and second signals of the selected FIFO cell changes;

a first circuit included in the FIFO unit to provide a first status signal based on the value of the third signal from each of the FIFO cells to indicate whether the FIFO unit is available to store information; and a second circuit included in the FIFO unit to provide a second status signal based on the value of the fourth signal from each of the FIFO cells to indicate whether the FIFO unit is available to be read.

13. The apparatus of claim 12, wherein the selected FIFO cell is to change the value of the each of the first and second signals between a first value and a second value; the first value corresponds to binary zero, and the second value corresponds to a binary one.

14. The apparatus of claim 12, wherein the memory location is included in a dual-port random access memory (RAM) circuit.

15. An apparatus comprising:

conductive lines on a circuit board;

an antenna coupled to the conductive lines;

a device coupled to the conductive lines; the device including an asynchronous first-in first-out (FIFO) unit, the FIFO unit including:
a first first-in first-out (FIFO) cell included in a FIFO unit to provide a first signal and a second signal, the first FIFO cell to change a value of the first signal when data information is stored in the first FIFO cell, to change a value of the second signal when data information is read from the first FIFO cell, and to provide a third signal based on the values of the first and second signals to indicate whether the first FIFO cell is available to store data information;
a second FIFO cell included in the FIFO unit to provide a fourth signal and a fifth signal, the second FIFO to change a value of the fourth signal when data information is stored in the second FIFO, to change a value of the fifth signal when data information is read from the second FIFO cell, and to provide a sixth signal based on the values of the fourth and fifth signals to indicate whether the second FIFO cell is available to store data information; and
a circuit included in the FIFO unit to provide a seventh signal based on the third and sixth signals to indicate whether the FIFO unit is available to store data information.

16. The apparatus of claim 15, wherein the device includes a processor.

17. The apparatus of claim 15, further comprising a connector coupled to at least one of the conductive lines and the device, the conductor conforming with at least one of Universal Serial Bus (USB), DisplayPort (DP), High-Definition Multimedia Interface (HDMI), Thunderbolt, Ethernet, and Peripheral Component Interconnect Express (PCIe) specifications.

* * * * *